United States Patent [19]
Kalampoukas et al.

[11] Patent Number: 5,675,576
[45] Date of Patent: Oct. 7, 1997

[54] CONCESTION CONTROL SYSTEM AND METHOD FOR PACKET SWITCHED NETWORKS PROVIDING MAX-MIN FAIRNESS

[75] Inventors: Lampros Kalampoukas; Anujan Varma, both of Santa Cruz, Calif.; Kadangode K. Ramakrishnan, Berkeley Heights, N.J.

[73] Assignee: Lucent Technologies Inc., Murray Hill, N.J.

[21] Appl. No.: 460,965

[22] Filed: Jun. 5, 1995

[51] Int. Cl.$^6$ ........................... H04L 12/24
[52] U.S. Cl. ............... 370/232; 370/395; 370/390; 370/522; 370/236
[58] Field of Search ............... 370/84, 17, 110.4, 370/111, 58.3, 58.2, 110.1, 60, 60.1, 58.1, 94.1, 229–236, 395–399, 905, 912, 522, 524, 389–391

[56] References Cited

U.S. PATENT DOCUMENTS 5,546,377  8/1996  Ozveren ........................... 370/13

OTHER PUBLICATIONS

Charny et al., "Congestion Control with Explicit Rate Indication", ATM Forum Doc. No. 94–0692 Jul. 1994.

Bonomi et al., "The Rate–Based Flow control Framework for the Available Bit Rate ATM Service", IEEE Network, pp. 25–39 Mar. 1995.

Tsang and Wong, "A New Rate–Based Switch Algorithm for ABR Traffic to Achieve Max–Min Fairness with Analytical Approximation and Delay Adjustment," INFOCOM 96, pp. 1174–1181 1996.

Sui and Tzeng, "Congestion Cotnrol for Multicast Service in ATM Networks," GLOBECOM 95, pp. 309–314 May 1995.

*Primary Examiner*—Douglas W. Olms
*Assistant Examiner*—Matthew C. Phillips

[57] ABSTRACT

A method is disclosed for rate allocation within the individual switches of a communications network implementing a rate-based congestion control approach for best-effort traffic. The methodology of the invention centers on a new rate allocation algorithm which performs its allocation functions independently of the number of connections sharing a network link and therefore performs an allocation in $\Theta(1)$ complexity. With that implementation simplicity, the algorithm is particularly advantageous for implementation in ATM switches carrying a large number of virtual channels. The algorithm operates on bandwidth information supplied from the source of a connection in special cells or packet headers, such as ATM Resource Management cells. By storing parameter values for other connections sharing a network link, the algorithm requires a constant number of simple computations for each request from a connection for a bandwidth allocation. The algorithm is asynchronous and distributed in nature and converges to the max-min fairness allocation.

43 Claims, 12 Drawing Sheets

FIG. 6A

```
1.  i-cell(VC)                        /* GET THE VC NUMBER */
2.  r_i^a-cell(CCR)                   /* GET THE CURRENT CELL LINE */
3.  p_i^a-cell(ER)                    /* GET THE AMOUNT OF REQUESTED BANDWIDTH */
4.  if (M^a<r_i^a) then                /* IF THE MAXIMUM REGISTERED REQUESTED BANDWIDTH IS LESS THAN CONNECTION i'S ALLOCATION */
5.      M^a-r_i^a                     /* SET THE MAXIMUM REQUESTED BANDWIDTH TO CONNECTION i'S CCR */
6.      m^a-i                         /* REGISTER CONNECTION i AS THE ONE WITH THE MAXIMUM REQUEST */
7.      if state_i^a=satisfied then    /* IF CONNECTION i IS MARKED AS SATISFIED */
8.          state_i^a-bottlenecked     /* INITIALLY MARK IT AS BOTTLENECKED */
9.          N_b^a-N_b^a+1              /* INCREASE THE NUMBER OF BOTTLENECKED CONNECTIONS BY ONE */
10.     end if
11. else if (M^a>r_i^a) then           /* IF THE REGISTERED MAXIMUM REQUEST IS LARGER THAN i'S CCR */
12.     if (m^a=i)                    /* IF IT WAS i THAT HAD THE MAXIMUM REQUEST */
13.         M^a-r_i^a                 /* UPDATE THE MAXIMUM REQUEST */
14.     end if
15. end if
16. R^a-R^a+p_i^a-1_i^a                /* UPDATE THE ESTIMATE OF THE TOTAL REQUESTED BANDWIDTH */
17. 1_i^a-p_i^a                       /* UPDATE THE RECORDED VALUE FOR i'S REQUESTS */
18. if (R^a>B^a) then                  /* IF THE TOTAL REQUESTED BANDWIDTH IS LARGER THAN THE BANDWIDTH AVAILABLE TO DATA TRAFFIC */
19.     if state_i^a=satisfied then    /* IF CONNECTION i IS MARKED AS SATISFIED */
20.         temp-N_b^a+1               /* INCREASE THE NUMBER OF BOTTLENECKED CONNECTIONS BY ONE AND TREAT i AS BOTTLENECKED */
21.     else
```

FIG. 6B

```
22.     temp-N_b^a                                      /* ELSE THE NUMBER OF BOTTLENECKED CONNECTIONS IS NOT AFFECTED */
23.     end if
24.     A_max^a-B_eq^a+ (B_f^a+A_i^a-B_eq^a)/temp        /* COMPUTE A NEW MAXIMUM FAIR ALLOCATION FOR CONNECTION i */
25.     if A_max^a<B_eq^a then                           /* IF THE NEWLY COMPUTED ALLOCATION IS LESS THAN THE EQUAL SHARE */
26.        A_max^a-B_eq^a                                /* SET THE ALLOCATION AT LEAST EQUAL TO THE NEW FAIR SHARE */
27.     end if
28.     if (p_i^a≤A_max^a) then                          /* IF CONNECTION i REQUESTS LESS BANDWIDTH THAN WHAT IS ALLOCATED ABOVE */
29.        A_max^a-p_i^a                                 /* CONNECTION i GETS WHAT IT REQUESTED */
30.        if (m^a=i) then                               /* IF THIS IS NOT THE CONNECTION WITH THE MAXIMUM REQUEST */
31.           if state_i^a=bottlenecked then             /* IF CONNECTION i IS NOT MARKED AS SATISFIED */
32.              state_i^a-satisfied                     /* MARK CONNECTION i AS SATISFIED */
33.              N_b^a-N_b^a-1                           /* DECREASE NUMBER OF BOTTLENECKED CONNECTIONS BY ONE */
34.           end if
35.        end if
36.     else                                             /* ELSE IF CONNECTION i ASKS FOR MORE BANDWIDTH THAN WHAT CAN BE ALLOCATED TO IT */
37.        if state_i^a=satisfied then                   /* IF CONNECTION i IS MARKED AS SATISFIED */
38.           state_i^a-bottlenecked                     /* UN-MARK CONNECTION i */
39.           N_b^a-N_b^a+1                              /* INCREASE NUMBER OF BOTTLENECKED CONNECTIONS BY ONE */
40.        end if
41.     end if
42.  else                                                /* IF THE TOTAL REQUESTED BANDWIDTH IS LESS THAN THE BANDWIDTH AVAILABLE FOR DATA TRAFFIC */
```

FIG. 6C

```
43.     if state_i^a=bottlenecked then          /* IF CONNECTION i IS BOTTLENECKED */
44.        state_i^a=satisfied                   /* MARK CONNECTION i AS SATISFIED */
45.        N_b^a=N_b^a-1                         /* DECREASE THE NUMBER OF BOTTLENECKED CONNECTIONS BY ONE */
46.        A_max^a=p_i^a                         /* ALLOCATE TO CONNECTION i WHAT IT REQUESTS */
47.     end if
48.  end if
49.  if (A_max^a>r_i^a) and (r_i^a>0) then       /* IF THE ALLOCATED BANDWIDTH IS LARGER THAN THE CURRENT RATE AND THE CURRENT RATE IS NON-ZERO */
50.     if (m^a≠i) then                          /* IF i IS NOT THE CONNECTION WITH THE MAXIMUM REQUEST */
51.        if state_i^a=bottlenecked then        /* IF i IS MARKED AS BOTTLENECKED */
52.           state_i^a=satisfied                /* MARK CONNECTION i AS SATISFIED SINCE i IS BOTTLENECKED AT ANOTHER LINK */
53.           N_b^a=N_b^a-1                      /* DECREASE THE NUMBER OF BOTTLENECKED CONNECTIONS BY ONE */
54.        end if
55.     end if
56.  end if
57.  if state_i^a=bottlenecked then              /* IF CONNECTION i IS MARKED AS BOTTLENECKED AFTER ALL */
58.     r_i^a=B_eq^a                             /* RECORD CONNECTION i AS GETTING ONLY THE EQUAL SHARE */
59.  end if
60.  B_f^a=B_f^a+A_i^a-f_i^a                     /* UPDATE THE ESTIMATE OF THE BANDWIDTH THAT CAN BE ALLOCATED TO THE BOTTLENECKED CONNECTIONS */
61.  A_i^a=r_i^a                                 /* RECORD THE ALLOCATED BANDWIDTH AS THE MINIMUM FROM CURRENT RATE AND COMPUTED ALLOCATION */
62.  cell(ER)=A_max^a                            /* SET THE EXPLICIT RATE FIELD OF THE CURRENT RESOURCE MANAGEMENT CELL */
63.  forward(cell)                               /* FORWARD THIS CELL TO THE NEXT SWITCH */
```

FIG. 7

| | |
|---|---|
| $a$ | AN IDENTIFIER OF THE OUTPUT MODULE (LINK) WHERE THE ALGORITHM IS CURRENTLY EXECUTED. $a$ IS USED AS SUPERSCRIPT TO INDICATE PARAMETERS OF SWITCH $a$. THE SUPERSCRIPT IS OMITTED WHEN THE DISCUSSION INVOLVES ONLY A SINGLE SWITCH. |
| $i$ | VC NUMBER OF THE CONNECTION THAT THE RECEIVED RM CELL BELONGS TO |
| $r_i^a$ | HOLDS THE "CURRENT RATE" FIELD OF RECEIVED RESOURCE MANAGEMENT CELL THAT IS THE TRANSMITTING RATE OF THE SOURCE WHEN THE CURRENT CELL WAS SENT OUT TO THE NETWORK |
| $p_i^a$ | THE BANDWIDTH THAT THE CURRENT CONNECTION REQUESTS. NOTICE THAT THIS VALUE IS CARRIED BY THE RESOURCE MANAGEMENT CELL AND IS DECREASED AS THE CELL MOVES DOWNSTREAM THROUGH PROGRESSIVELY CONGESTED SWITCHES |
| $M^a$ | THE MAXIMUM REQUESTED BANDWIDTH BY THE CONNECTIONS GOING THROUGH OUTPUT LINK $a$ |
| $m^a$ | THE VC NUMBER OF THE CONNECTION WITH THE MAXIMUM REQUESTED BANDWIDTH |
| $N_b^a$ | THE NUMBER OF BOTTLENECKED CONNECTIONS AS SEEN BY THE CURRENT OUTPUT MODULE $a$ |
| $state_i^a$ | STATE OF CONNECTION $i$ IN SWITCH $a$ (SATISFIED OR BOTTLENECKED) |
| $R^a$ | THE TOTAL BANDWIDTH REQUESTED BY THE CONNECTIONS DESTINED TO OUTPUT LINK $a$ |
| $l_i^a$ | THE LAST RECORDED VALUE FOR THE BANDWIDTH REQUESTED BY SOME CONNECTION $i$ |
| $B^a$ | THE TOTAL LINK BANDWIDTH AVAILABLE FOR BEST-EFFORT TRAFFIC |
| temp | A TEMPORARY VARIABLE |
| $B_{eq}^a$ | THE EQUAL SHARE OF BANDWIDTH. EVERY CONNECTION USING LINK $a$ GETS AT LEAST $B_{eq}^a$ UNLESS ITS REQUEST IS LESS THAN $B_{eq}^a$ |
| $S^a$ | THE NUMBER OF ACTIVE CONNECTION GOING THROUGH LINK $a$ |
| $A_{max}^a$ | THE MAXIMUM AMOUNT OF BANDWIDTH AVAILABLE FOR ALLOCATION TO CONNECTION $i$ |
| $B_f^a$ | A MEASURE OF THE AMOUNT OF FREE BANDWIDTH AVAILABLE FOR BOTTLENECKED CONNECTIONS |
| $A_i^a$ | THE LAST BANDWIDTH ALLOCATION TO CONNECTION $i$. IF THE CONNECTION IS SATISFIED, THEN $A_i^a$ IS EQUAL TO $\min(p_i^a, r_i^a)$, OTHERWISE IS LIMITED TO $B_{eq}^a$ |

FIG. 8

```
i-cell(VC)                    /* GET THE VC NUMBER */

N^a ← N^a + 1                 /* INCREASE THE NUMBER OF ACTIVE CONNECTIONS BY ONE */

B^a_eq ← B^a / N^a            /* RECOMPUTE THE MINIMUM FAIR SHARE */ state^a_i ← bottlenecked      /* INITIALIZE THE STATE OF THE NEW CONNECTION TO BE BOTTLENECKED */

N^a_b ← N^a_b + 1             /* INCREASE THE NUMBER OF BOTTLENECKED CONNECTIONS BY ONE */ l^a_i ← 0                     /* SET THE LAST RECORDED REQUEST FOR BANDWIDTH TO ZERO */

A^a_i ← 0                     /* SET ITS CURRENT ALLOCATION TO ZERO */
```

FIG. 9

```
i-cell(VC)                                    /* GET THE VC NUMBER */

$N^a \leftarrow N^a - 1$                      /* DECREASE THE NUMBER OF ACTIVE CONNECTIONS BY ONE */

$B_{eq}^a \leftarrow \frac{B^a}{N^a}$         /* RECOMPUTE THE MINIMUM FAIR SHARE */

$B_f^a \leftarrow B_f^a + A_i^a$              /* INCREASE THE BANDWIDTH TO BE SHARED BY BOTTLENECKED CONNECTIONS BY THE
                                                 BANDWIDTH ALLOCATED TO i */

$R^a \leftarrow R^a + 1_i^a$                  /* DECREASE THE TOTAL REQUESTED BANDWIDTH BY THE AMOUNT REQUESTED BY i */ if $state_i^a$ = bottlenecked then            /* IF CONNECTION i IS MARKED AS BOTTLENECKED */
    $N_b^a \leftarrow N_b^a - 1$              /* DECREASE THE NUMBER OF BOTTLENECKED CONNECTIONS BY ONE */
end if if ($m^a$ = i) then                           /* IF CONNECTION i WAS THE ONE WITH THE MAXIMUM REQUESTED BANDWIDTH */
    $M^a = 0$                                 /* RESET THE VALUE OF MAXIMUM REQUESTED BANDWIDTH TO ZERO; NEW CYCLE FOR
                                                 FINDING MAXIMUM WILL START */
    $m^a \leftarrow (-1)$                     /* INVALIDATE THE NUMBER OF THE CONNECTION WITH THE MAXIMUM REQUEST */
end if
```

CONGESTION CONTROL SYSTEM AND METHOD FOR PACKET SWITCHED NETWORKS PROVIDING MAX-MIN FAIRNESS

FIELD OF THE INVENTION

This application is related to congestion control systems for communications networks and more particularly to an efficient method for carrying out such congestion control in packet-switched networks providing fairness.

BACKGROUND OF THE INVENTION

Asynchronous Transfer Mode (ATM) is a networking protocol designed to efficiently support high speed digital voice and data communications. It is generally believed that, within the next 5–10 years, most of the voice and data traffic generated throughout the world will be transmitted by ATM technology.

Broadband packet networks based on Asynchronous Transfer Mode are enabling the integration of traffic with a wide range of characteristics within a single communication network. In these networks, all communication at the ATM layer is in terms of fixed-size packets, called "cells" in ATM terminology. An ATM cell consists of 48 bytes of payload and 5 bytes for the ATM-layer header. Routing of cells is accomplished through packet switches over virtual circuits set up between endpoints. By the use of proper traffic scheduling algorithms, ATM is capable of handling multiple classes of traffic ranging from real-time video to best-effort traffic requiring no quality-of-service guarantees. An industry group, the ATM Forum, has defined a family of service categories to address these classes of traffic—specifically: Constant Bit Rate (CBR) service, Variable Bit Rate (VBR) service, Unspecified Bit Rate (UBR) service and Available Bit Rate (ABR) service. The ABR service category corresponds to "best-effort" traffic which is the focus for a preferred embodiment of the system and method of our invention.

A primary motivation for development of the ABR service category was the economical support of data traffic where each packet of data is segmented into ATM cells. Such "best-effort" traffic will generally be characterized as having no real-time deadlines and requiring weak guarantees on the available bandwidth, delay, or cell loss rate. This "best-effort" mode is similar in nature to the service provided by the current Internet (generally using the Transmission Control Protocol (TCP) or User Datagram Protocol (UDP)), except that connections still need to be set up at the ATM layer over virtual circuits between endpoints, either explicitly or implicitly.

ATM raises new opportunities for implementing congestion control at a lower layer, providing the potential for improving the performance of TCP even above that obtained in today's datagram networks. The higher speed and possibly better congestion control algorithms which may arise with ATM's ABR service offer promise even for protocols designed for today's datagram service. The fixed size of ATM cells simplifies the implementation of the switching function in many cases, thus enabling ATM networks to scale up to high speeds.

Several congestion-control approaches for best effort traffic in ATM networks have been proposed recently. These include packet discard schemes(Romanow94), link-level flow control (H. T. Kung, T. Blackwell, and A. Chapman, "Credit-Based Flow Control for ATM Networks: Credit Update Protocol, Adaptive Credit Allocation, and Statistical Multiplexing", *Proceedings of SIGCOMM-'94*, September 1994) and rate control with explicit congestion notification (P. Newman, "Traffic Management for ATM Local Area Networks", *IEEE Communications, August* 1994, pp. 34–50). Approaches for improving the performance of TCP in high-speed ATM networks are described in M. Perloff, K. Ress, "Improvements to TCP Performance in High-Speed ATM Networks", *Communications of the ACM*, Vol. 38, No. 2, pp. 90–100, February 1995. The approach considered in Perloff & Ress makes use of a special bit in the ATM cells that carry TCP segments. This bit is set in cells corresponding to TCP segments that are transmitted when TCP is increasing its congestion window. In conditions of congestion, cells with this bit are the first to be dropped.

There are a number of problems with these prior-art approaches including, in many cases, failure to achieve fairness in the allocation of link capacity among competing data flows, complicated buffering and/or queuing schemes, and, in some cases an absence of an end-to-end perspective for the control mechanism. Additionally, all of these approaches require either prior knowledge of the network configuration in order to set correctly the appropriate parameters or cooperation between the high-level protocols and the congestion control mechanisms at the ATM-layer.

Another approach, explicit rate setting, which has been chosen by the ATM Forum as the best match for the ABR service, controls the bandwidth allocation to the connections directly. Since each ATM cell contains the same number of bits, control of a connection's bandwidth, measured as a bit rate, is achieved by directly controlling its cell rate, hence the approach is referred to as rate-based flow control. Control of the cell rate for a connection would occur at least at the transmission source, which would shape the connection's traffic as directed by feedback from the network. Optionally, such control may occur at points within the network as well. Under a rate-based framework, the share of bandwidth allocated to a connection is not supposed to depend on the delays between points where data is shaped on a per-connection basis. For a more thorough discussion of the rate-based framework for congestion control in ATM networks, see F. Bonomi and K. Fendick, "The Rate-Based Flow Control Framework For The Available Bit Rate ATM Service," *IEEE Network*, March/April 1995, pp. 25–39.

The rate-based congestion control approach has the potential to provide close-to-ideal throughput with a fraction of the buffering required by link-level flow control, especially for wide area networks. With explicit rate setting, the source of each connection periodically transmits a special resource management (RM) cell. The RM cell specifies the bandwidth requested by the connection. Each switch on the path of the RM cell may modify the request based on the bandwidth it is able to allocate to the connection on its outbound link. On reaching its destination, the RM cell, having had its bandwidth request reduced by any switch unable to allocate the requested bandwidth, is returned to the source, which will then set its rate based on that of the bottleneck link in the path of the connection.

The rate-based approach requires an algorithm for fair allocation of bandwidth among the connections sharing a common output link of a switch. On receipt of an RM cell from a connection (or, in the general case, a packet containing comparable information), the algorithm is invoked to determine the current bandwidth allocation of the connection on the output link, taking into account the available bandwidth and the current allocations of other connections. Such an algorithm for rate allocation in packet-switching networks was described by Charny (A. Charny, "An Algorithm for Rate Allocation in a Packet-Switching Network with Feedback," M. S. Thesis, MIT, Dept. of Electrical and Computer Science, Cambridge, Mass., 1994, hereafter cited as Charny94). Upon convergence, the allocations computed by this algorithm have been shown to satisfy max-min fairness—that concept being described by D. Bertsekas and R. Gallager, *Data Networks*, Prentice Hall, Inc., 2nd edition, 1992, hereafter cited as Bertsekas92. The Charny94 algorithm, however, requires examining the state of other active connections on the receipt of each RM cell, making its worst-case complexity $\Theta(n)$, where n is the number of active connections sharing the outgoing link of the switch. This makes it unsuitable for use in an ATM switch supporting a large number of virtual channels per output link.

Accordingly, it is an object of our invention to provide a more efficient process for implementing the rate-based congestion control approach while still maintaining the max-min fairness criterion.

SUMMARY OF THE INVENTION

A congestion control method for communications networks operating to cause a data source to periodically inject into a data flow from that source a first indicator representative of a rate at which the source is currently transmitting data to the network and a second indicator representative of a rate at which the source is desirous of transmitting data. The method of the invention then determines an allocation according to a predetermined criterion for bandwidth to be apportioned among competing data flows at switches within the network and operates on the second indicator sent by the source at successive switches in a transmission path in that network between the source and a destination to compare the rate represented by that second indicator with a maximum rate allocation determined by each switch. Where the rate represented by that second indicator is greater than that maximum rate allocation the invention causes the rate representation in that second indicator to be changed to that maximum rate allocation. After the first and second indicators from the source under consideration have traversed all switches in the network transmission path between that source and the addressed destination, the method of the invention causes those first and said second indicators to be returned to the source, whereby any modification of the rate represented by that second indicator by any of the traversed switches operates to establish a maximum data transmission rate for that source.

BRIEF DESCRIPTION OF THE DRAWINGS

FIG. 6 presents the pseudo-code for the rate allocation algorithm of the invention.

FIG. 7 provides a listing of definitions and notations for the algorithm pseudo-code of FIG. 6.

FIG. 8 presents the pseudo-code executed when a new connection opens in a switch carrying out the method of the invention.

FIG. 9 presents the pseudo-code executed when a connection closes in a switch carrying out the method of the invention.

DETAILED DESCRIPTION OF THE INVENTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 3 and 4 may be provided by a single shared processor. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 1:
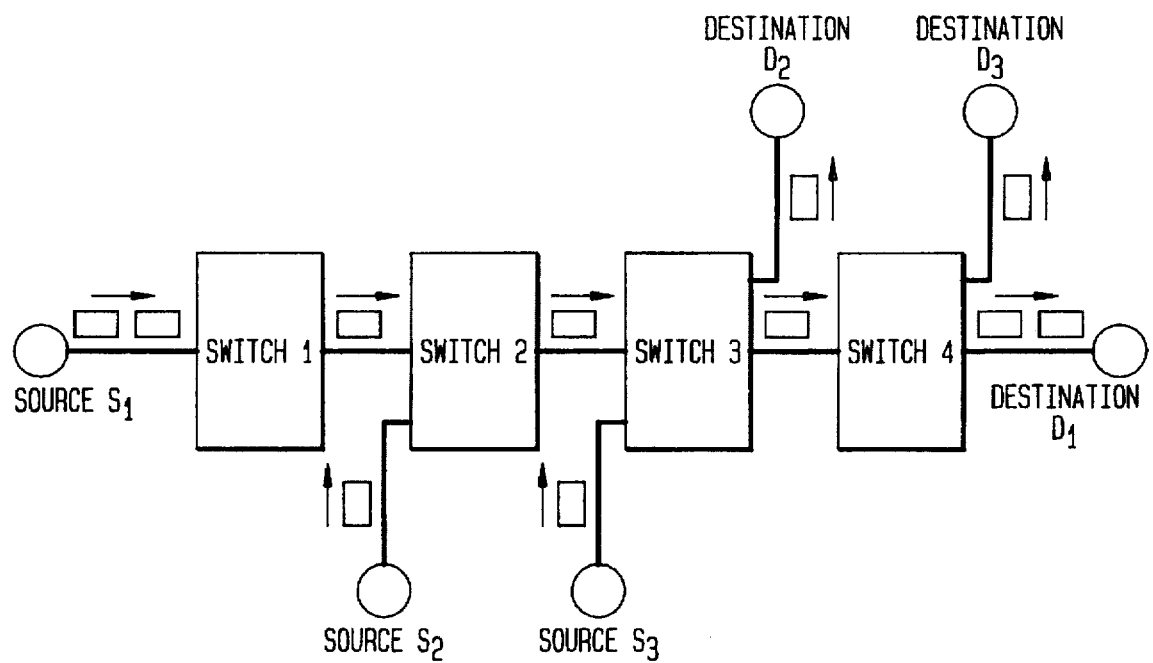
FIG. 1 depicts an exemplary network configuration for implementing the system of the invention.

As will be readily understood, the congestion control method of the invention is implemented within a communications network. A simplified, but nonetheless illustrative such network is shown in FIG. 1. In that figure, the network is seen to comprise four switches (Nos. 1, 2, 3 & 4) connected in tandem to provide a network for interconnecting various host computers depicted as either a source or a destination for communications traffic transmitted across the network. Illustratively, a communications path from Source $S_2$ to Destination $D_2$ would traverse the path from an input port for Switch 2, through that switch and out at an output port therefrom, thence over a transmission line connecting Switches 2 and 3 and into an input port of Switch 3. After being switched to an appropriate output port by Switch 3, the path would continue from that output port to Destination $D_2$.

Because the congestion control method of the invention is connection oriented, we choose, in a preferred embodiment, to illustrate the implementation of virtual circuits in the network of FIG. 1. With that virtual circuit implementation of our preferred embodiment, all of the packets belonging to a particular virtual circuit will traverse the same path through the network from source to destination.

It should be understood, however, that the network could be implemented as a connectionless, or datagram network and the method of the invention would still operate, albeit with some degradation of performance levels. By having a switch maintain state on a source-destination basis, we could come close to the result described here. The identity of a connection would be based on a mapping of the source-destination addresses to a unique identity.

In the virtual circuit implementation of the congestion control framework of our invention, the rate of transmission of packets belonging to each virtual circuit is controlled individually by the source of the virtual circuit, based on a feedback mechanism. Within each virtual circuit the source periodically transmits congestion control information. Such information may be transmitted as separate packets or may be piggy-backed onto data packets. In the preferred embodiment of the invention, such congestion control information is transmitted via separate packets, and in the particular context of ATM technology, those separate packets are designated as resource management (RM) cells. Once the RM cells reach the destination of the virtual circuit they are returned to the source via a reverse path in the network. In the preferred embodiment of the invention, all of the processing required for bandwidth allocation according to the method of the invention is performed when an RM cell travelling in the forward direction is received at a switch. In this embodiment, no processing is performed by the switches on an RM cell traveling backward to the source, although it will be apparent that the forward direction processing of the preferred embodiment could readily be implemented in the rearward direction.

The rate allocation algorithm of our invention, which will be described in detail hereafter, is applied to each switch of the network independently. Within a switch, separate instances of the algorithm are executed at each output port of the switch (or input port in the case of an input buffered switch) to control the allocation of bandwidth among the connections sharing the corresponding outgoing link. However, it should be understood that the allocation may be performed by a central processor in the switch which is responsible for managing each one of the outgoing links.

Figure 2:
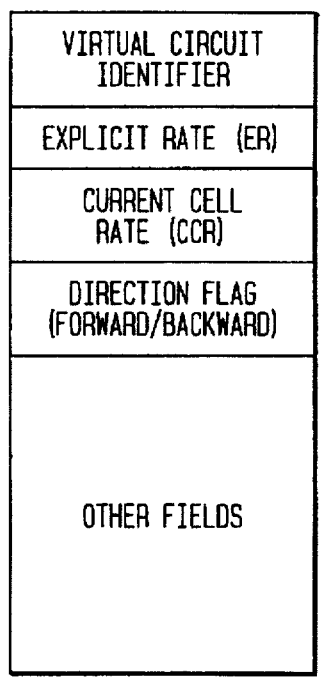
FIG. 2 depicts the required fields for the congestion control information packet associated with the method of the invention.

FIG. 2 depicts the required fields for the congestion control information packet associated with the method of the invention. The specific designators shown in that figure for those fields correspond to designations adopted by the ATM Forum for the fields of an RM cell. In the operation of the method of the invention, the Explicit Rate (ER) field is set by the source of the virtual circuit connection to the amount of bandwidth it requests. The rate allocation algorithm of our invention operating in a switch on the path of the connection may modify this field as the RM cell passes through the switch, by reducing the value thereof to the maximum amount of bandwidth it is able to allocate to the connection on the outgoing link, if such maximum amount is less than the value in the ER field of the received RM cell.

Figure 3:
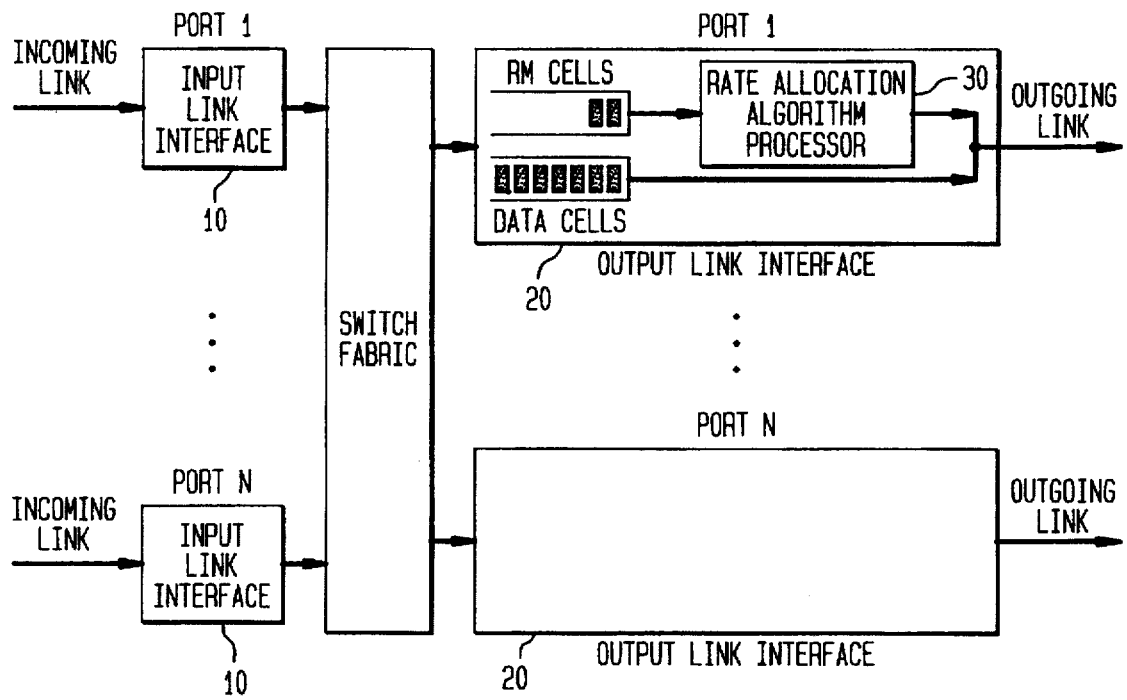
FIG. 3 shows a specific implementation of the congestion control method of the invention in an output buffered switch.

The CCR field is set by the source of the connection and is not modified by the switches. This field indicates the current transmission rate of the source. It is assumed that the source would set the CCR field based on the ER value in the RM cell that was returned by the network most recently. The latter value represents the bandwidth available at the bottleneck link in the network at the time the most recent RM cell traversed it. Note also that the congestion control information packet needs to specify the virtual circuit it belongs to (although this could be part of the normal packet header) and the direction of the packet (forward/backward)—to facilitate the performance of the rate allocation algorithm as the packet passes through the switch in one direction, and the passage through the switch without processing as it travels in the reverse direction. In FIG. 3 we show a specific implementation of the congestion control method of the invention in an output buffered switch—i.e., a switch having its buffering and congestion control processing at its output ports. As can be seen in the figure, this exemplary switch has a plurality of input ports (illustratively 1 to N) interfaced to the incoming links by Input Link Interface modules 10, and a plurality of output ports (illustratively also 1 to N) interfaced to the outgoing links by a corresponding plurality of Output Link Interface modules 20. Each of the Output Link Interface modules provides buffering and processing functionality for buffering data for connections traversing the link and, potentially, for separating the RM cells associated with a connection from data cells for that connection. Such separated RM cells are then fed to Rate Allocation Algorithm Processor 30 for processing in accordance with the algorithm of our invention. After such processing of the RM cells, they are then recombined with the data cells for the associated connection by the Output Link Interface module, such that the relative order of transmission of packets within each virtual circuit is maintained.

[Although we illustrate the case of separation and recombination of RM cells, it should be understood that our invention does not preclude the processing of an RM cell without such separation and recombination. Such a non-separation practice does, however, require a relatively fast processor.]

As previously indicated, a separate instance of the rate allocation algorithm is used to control the allocation of bandwidth on each outgoing link. Accordingly, it will be understood that each of the plurality of Output Link Interface modules will be configured to include Rate Allocation Algorithm Processor 30 in the same manner as depicted for the Output Link Interface module associated with Port 1, and will carry out the same buffering and processing functions described above for that illustrative Output Link Interface module.

Figure 4:
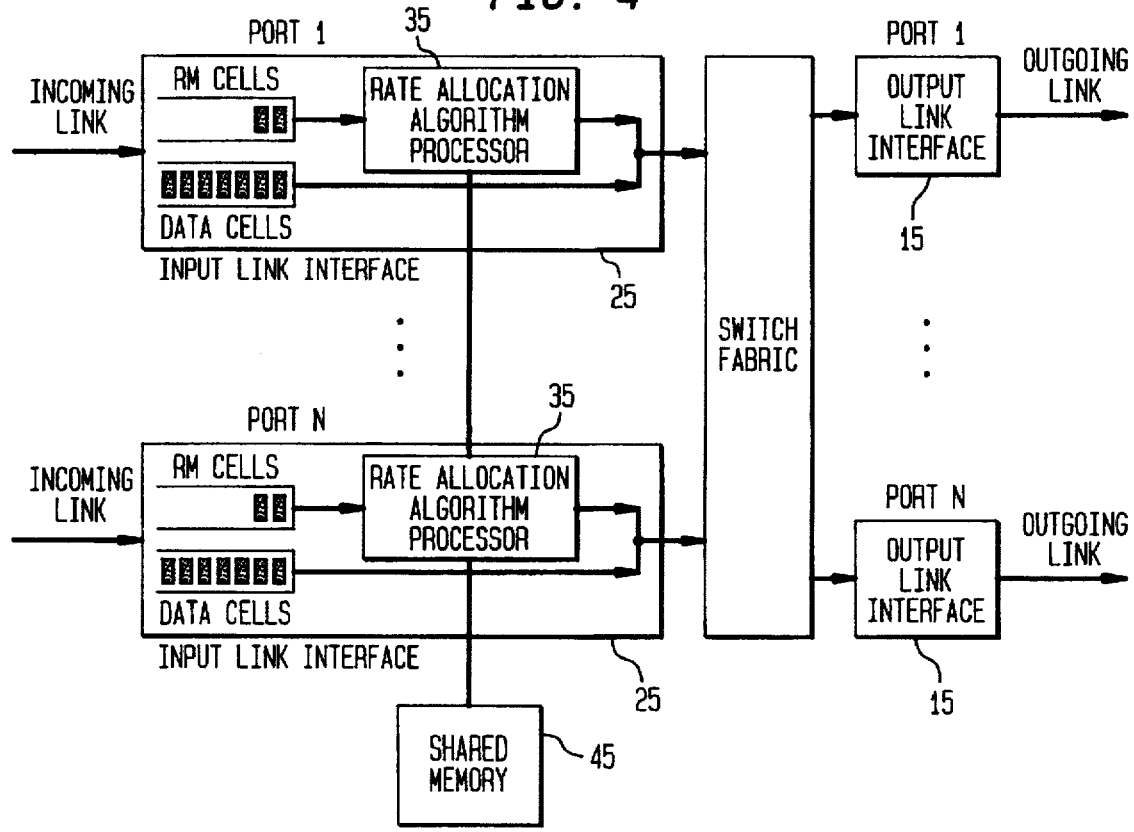
FIG. 4 provides a specific implementation of the congestion control method of the invention in an input buffered switch.

FIG. 4 provides a specific implementation of the congestion control method of the invention in an input buffered switch—i.e., a switch having its buffering and congestion control processing at its input ports. As will be apparent from the figure, with respect to our invention's processing functions, Output Link Interface modules 15 correspond functionally to the Input Link Interface modules 10 of FIG. 3, and Input Link Interface modules 25, along with Rate Allocation Algorithm Processors 35, correspond essentially to Output Link Interface modules 20 and Rate Allocation Algorithm Processors 30 of FIG. 3. However, since with such an input buffered switch, the packets arriving at an input port of the switch may be destined to any of the output ports, it is not possible to run separate instances of the rate allocation algorithm independently at each input port. Instead, separate instances of the algorithm are run at each Input Link Interface, but each instance can perform allocations for any of the outgoing links. The collective algorithm instances maintain all of the shared allocation parameters in a common shared memory 45 to achieve this result. Synchronization among the multiple algorithm instances can be performed by the use of well known methods for locking accesses to shared variables during execution of the algorithm instances.

The congestion control method of our invention will also be applicable to multicast virtual circuits—i.e., a common source transmitting to multiple destinations. Referring to FIG. 1, consider, as an illustrative multicast arrangement, a transmission from Source $S_3$ to Destinations $D_2$ and $D_3$. Since the path from $S_3$ to $D_2$ only traverses one switch (Sw. 2) while the path from $S_3$ to $D_3$ traverses two switches (Sw. 2 and Sw. 3), Sw. 3 may represent a bottleneck, or bandwidth limitation, for the $S_3$ to $D_3$ path which did not exist in the $S_3$ to $D_2$ path. We deal with this potential constraint in some, but less than all, of the paths of a multicast transmission by setting the new CCR—upon return to the source of the collective RM cells for each of the multicast paths—to the minimum available bandwidth for any of those multicast paths. At any particular switch, the allocation to each one of the RM cells of the multicast flows of a multicast connection is the minimum allocation across all of the flows of the connection. The process of combining the returned RM cells for the several multicast paths can be performed by well known prior art methods. In our preferred embodiment for dealing with multicast flows, we require the switch to find the minimum ER value in the backward direction from among those cells in the multicast flows, that minimum ER value to be then placed in the combined RM cell which is then forwarded in the backward direction. However, this approach is not essential.

Having described the network environment for the implementation of our congestion control methodology, we now turn to a discussion of the specific functionality of that methodology. In the rate-based congestion control scheme which provides the infrastructure for our invention, the source of each connection requests a specific amount of bandwidth to be allocated to the connection by the switches on its path to the destination. In the preferred embodiment, using ATM technology, that request is carried by special RM cells transmitted periodically by the source. It is noted that this infrastructure is similar to that described in Charny94. With this congestion control infrastructure, each RM cell has the following fields, as depicted in FIG. 2:

1. A virtual circuit identifier for identifying the connection that cell belongs to.
2. The amount of bandwidth requested, called the explicit rate (ER).
3. The current cell rate (CCR), which is set by the source of the connection and is not modified by the switches. This field indicates the current transmission rate of the source. It is assumed that the source would set the CCR field based on the ER value in the RM cell that was returned by the network most recently. The latter reflects the bandwidth available at the bottleneck link in the network at the time the most recent RM cell traversed it.
4. A bit indicating the direction of the RM cell—which is necessary to distinguish an RM cell transmitted by the source of a connection from one returned by the destination to the source.

Note that ER is the bandwidth requested by the connection during the current epoch—i.e., traversal of the network from source to destination and return for the RM cell, while CCR is the current transmission rate of the source. As the RM cell passes through the network, each switch reads the ER and attempts to allocate this bandwidth on the output link. Assume that execution of a rate allocation algorithm in the switch produces $A_{max}$ as the maximum bandwidth that can be allocated to the connection without violating fairness. The switch then allocates the minimum among the CCR, ER, and $A_{max}$ to the connection on its outbound link. At the same time, if $A_{max}$ is less than ER, the request field in the RM cell is updated to An before propagating the cell to the next switch. Thus, when the RM cell reaches the destination, the ER field reflects the bandwidth available at the bottleneck link along the path. It will be seen that, with the described approach, if CCR is less than ER or $A_{max}$ the allocation may be less than the value placed in the ER field of the forwarded RM cell, thus constituting this an aggressive bandwidth allocation approach. It would also be appropriate to follow a conservative approach and set the allocation as the minimum of the $A_{max}$ and ER values.

When the destination of a connection receives an RM cell, the cell is immediately returned to the source through a reverse path. On receipt of the RM cell, the source adjusts its rate to be within the value in the ER field, which represents the maximum fair bandwidth available to the connection on the bottleneck link. The CCR of subsequent RM cells will be set to reflect this new allocated rate. The source may request a change in its allocated rate by setting the ER field of RM cells to the desired value.

Rate allocation within a switch must be performed according to some fairness criterion, so that the total available bandwidth on the outbound link is divided fairly among the connections sharing the link. A commonly used fairness criterion is max-rain fairness as described in Bertsekas92. To briefly illustrate the concept of max-rain fairness, Let $\rho_1, \rho_2, \ldots, \rho_N$ be the requests of individual connections sharing a link and $A_1, A_2, \ldots, A_N$ be the allocation produced by the rate allocation algorithm. The allocation is max-min fair, when a request is either completely satisfied, or receives an allocation equal to the maximum among all connections. That is, those bandwidth requests that are not completely satisfied by the allocation receive equal shares of the output bandwidth. In equation form, max-rain fairness can be expressed as:

$$\text{if } A_i < \rho_i, \text{ then } A_i = \max_j A_j$$

In addition, the sum of the $A_i$s should equal the total bandwidth available if there is at least one connection with $A_i < P_i$. Thus, under such a max-min fairness allocation, each request is either completely satisfied or receives an identical share as any other connection that is not completely satisfied.

A principal facet of our invention is a new rate allocation algorithm, which will be disclosed in detail hereafter, having an execution time of order one—$\Theta(1)$. Because the execution time of our algorithm is independent of the number of virtual channels sharing the output link, the algorithm is particularly advantageous for implementation in ATM switches carrying a large number of virtual channels. Moreover, when the total available capacity or the requests of the individual connections change, the algorithm quickly converges to the max-min allocation. The worst-case convergence time is $$\Theta\left(M\left(2D+\frac{1}{R}\right)\right),$$

where D is the round-trip delay, M is the number of distinct values in the max-min allocation, and R is the rate at which resource-management (RM) cells are transmitted by each source. Proof of this convergence quality is provided in a paper authored by the inventors to be published contemporaneously with the filing of this application—see L. Kalampoukas, A. Varma and K. K. Ramakrishnan, "An Efficient Rate Allocation Algorithm for Packet-Switched Networks Providing Max-Min Fairness," 1995, [Manuscript in preparation], hereafter cited as Kalampoukas95.

Our algorithm is asynchronous and distributed in nature. It does not require cooperation of all the switches in the network, and it can be applied in a network with varying link speeds. As previously implied, the algorithm makes use of special RM cells in the manner of Charny94. It is robust in that it can operate even if some of these special cells are lost or if the bandwidth available to the best-effort traffic is not constant. Algorithmically, its complexity is $\Theta(1)$.

A primary advantage of our algorithm over the rate allocation algorithm taught by Charny94 is found in the implementation complexity. As will be seen from Charny94 and the abbreviated discussion here of the teachings therein, the asymptotic complexity of the algorithm described in Charny94 can be characterized as $\Theta(n)$ since, upon a receipt of an RM cell, the algorithm requires a search of the state of all of the active virtual connections (VCs). In contrast, our algorithm, while still being asynchronous and distributed in nature, attains max-min bandwidth allocations and requires a constant number of simple computations for every RM cell received, thus reducing the asymptotic complexity to $\Theta(1)$.

It should also be noted that the packet (or cell) format used in the bandwidth allocation methodology of our invention differs from that in the scheme of Charny94. Specifically, the methodology of our invention requires an additional arithmetic value to be carried by the RM cell instead of just another bit—to wit, the u-bit utilized in the approach of Charny94. While our rate allocation algorithm could operate with the packet format described in Charny94, we chose a different (and slightly more complex) format because it simplifies the operation of the algorithm while at the same time providing lower upper bounds to the convergence time of the algorithm.

To complete the description of the network environment assumed by our rate allocation methodology, we also need to address briefly how the opening and closing of connections are handled in the algorithm. When a new connection is opened, each switch on its path will receive the virtual circuit identifier of the connection as part of the connection setup process. Before receiving the first RM cell from the connection, the switch under consideration will update a number of parameters maintained by the rate allocation algorithm, such as the number of active connections sharing the output link. The source may transmit data during the first round-trip epoch at a designated initial rate chosen small enough—e.g., $\frac{1}{1000}$ of the total link capacity, to avoid causing a short-term overload in the network. Likewise, when a connection is closed, every switch on its path must be signaled to update the parameters maintained by the rate allocation algorithm.

Before we proceed to describe our rate allocation algorithm in detail, we will describe the main ideas on which that algorithm is based, along with needed definitions and notations. To illustrate the essential principles of our rate allocation algorithm, consider any switch in the path of a connection. Let $S(t)$ be the set of active connections sharing the outbound link of this switch at time t. At any time, connections in $S(t)$ can be in one of two states—bottlenecked or satisfied. We designate a connection as satisfied if, at the most recent update of its allocation, the connection's request was completely satisfied. The state of the connection is designated as bottlenecked if the allocation it received most recently at the switch was less than its request. We denote the set of satisfied connections at time t as $S_u(t)$ and the set of bottlenecked connections by $S_b(t)$. Let $N_u(t)$ and $N_b(t)$ denote the sizes of the sets $S(t)$, $S_u(t)$, and $S_b(t)$, respectively.

Let $B(t)$ be the total bandwidth available on the outbound link to allocate to best-effort traffic. Let $\rho_i$ be the value of the most recent request from connection i, as taken from the ER field of the most recent RM cell received in the forward direction from that connection. $A_i(t)$ represents the corresponding allocation received by connection i during its most recent update.

With this notation, we can now describe the key principles of our rate allocation algorithm. The algorithm is invoked whenever an RM cell is received from any of the connections sharing the outgoing link that it controls. In addition, parameters maintained by the algorithm must be initialized using separate initialization code when the algorithm is started; the parameters must also be updated when a new connection is opened or an existing connection closes. We begin by describing the main algorithm that is invoked for every forward RM cell. The initialization code and the code to update parameters during opening and closing of connections are described later.

As an initial matter, the goal of our methodology, and the algorithm which implements that methodology, is to make available to each bottlenecked connection at time t, a maximum bandwidth equal to $$A_{max}(t) = \frac{\text{Total bandwidth available to bottlenecked connections}}{\text{Number of bottlenecked connections}} \quad (1)$$

The total bandwidth available to bottlenecked connections is the bandwidth left over after allocating to satisfied connections. Therefore, the above equation becomes $$A_{max}(t) = \frac{B(t) - \sum_{i \in S_u(t)} A_i(t)}{N_b(t)} \quad (2)$$

On receipt of an RM cell from a connection, the first step in the algorithm is to determine the new state of that connection with the current values of the parameters. This step is performed as follows: Assume that an RM cell is received from connection j, say at time $t_1$. If the connection j is currently marked as bottlenecked, the algorithm checks whether its state needs to be changed to satisfied. This is accomplished by means of the following calculations: The maximum bandwidth available to connection j, that is $A_{max}(t_1)$, is determined from Equation (2) above using the current values of the parameters in that equation. If the $A_{max}(t_1)$ so obtained is larger than the current request $\rho_j$ of connection j, then its state is changed to satisfied. On the other hand, if the connection j was in the satisfied state when the RM cell is received from it, then the algorithm checks if the state of the connection needs to be changed to the bottlenecked state, given the current values of the parameters. This checking is accomplished by temporarily setting the state of connection j as bottlenecked and going through a computation similar to that of Equation (2) to determine the maximum bandwidth that would be allocated to it. The following equation is used to determine $A_{max}(t_1)$ in this case.

$$A_{max}(t) = \frac{B(t) - \sum_{i \in S_u(t)} A_i(t) + A_j(t)}{N_b(t) + 1} \quad (3)$$

The computations in both equations (2) and (3) can be performed without searching the state of each connection by maintaining the total bandwidth available for allocation to bottlenecked connections at time t, given by $$B_b(t) = B(t) - \sum_{i \in S_u(t)} A_i(t) \quad (4)$$

That is, the current bandwidth that can be allocated to bottlenecked connections is the total available bandwidth minus the total bandwidth currently allocated to connections in the satisfied state. Instead of $B_b(t)$, in our algorithm we maintain the quantity $$B_j(t) = B(t) - \sum_{i \in S_u(t)} A_i(t) - \sum_{i \in S_b(t)} \frac{B(t)}{N(t)} \quad (5)$$

We refer to $B_f(t)$ as the "free bandwidth." Note that $B(t)/N(t)$ is the equal share of a connection and is the minimum bandwidth it is entitled to receive under any fair allocation. We denote $B(t)/N(t)$ by $B_{eq}(t)$, the equal share. Since $N_b(t)+N_u(t)=N(t)$ (that is, the number of connections in bottlenecked and satisfied states must add up to the total number of active connections), Equation (5) can also be written as $$B_j(t) = N_u(t)B_{eq}(t) - \sum_{i \in S_u(t)} A_i(t) \quad (6)$$

Thus, the free bandwidth can be seen as the bandwidth available as a result of the satisfied connections not requesting their equal share. Using $B_f(t)$ to compute the allocation instead of the actual available bandwidth has an advantage —to wit: when a new connection is opened, $N(t)$ increases by one even before the connection sends its first RM cell (we assume a new connection is bottlenecked at this switch). This has the effect of reducing $B_f(t)$ in Equation (5), thus reducing the allocation to existing connections. This helps to reduce congestion during the transient period when the algorithm is converging to a new max-min fair allocation.

Since we use $B_f(t)$ instead of $B(t)$ in the algorithm, we re-write Equation (2), used to check state changes for bottlenecked connection, as follows:

$$A_{max}(t) = B_{eq}(t) + \frac{B_f(t)}{N_b(t)} \quad (7)$$

Similarly, we re-write Equation (3), used to check state changes for a satisfied connection, as follows:

$$A_{max}(t) = B_{eq}(t) + \frac{B_f(t) + A_j(t) - B_{eq}(t)}{N_b(t) + 1} \quad (8)$$

Thus, equations (7) and (8) are the actual ones used by the algorithm in its first step to detect state changes of connections. Note that, if a state change is found to occur, the parameters $N_b(t)$ and $N_u(t)$ must be updated to reflect the new state.

Once the state of connection j has been updated, the second step of the algorithm is to update the actual allocation maintained for the connection j. The new allocation $A_j(t_1)$ for connection j is computed based on the parameters of the RM cell received at $t_1$ as follows:

1. If the maximum allocation $A_{max}(t_1)$, computed in the first step of the algorithm, is less than both the request $p_j(t_1)$ and the value of CCR in the RM cell received, then the allocation $A_j(t_1)$ is recorded as $A_{max}(t_1)$.
2. If the computed $A_{max}(t_1)$ is equal to or more than the minimum of $p_j(t_1)$ and the value of CCR in the RM cell received, then $A_j(t_1)$ is recorded as the minimum of $p_j(t_1)$ and the value of CCR in the RM cell received.

In addition to recording the local allocation, the algorithm also updates the ER field of the RM cell before transmitting it through the outgoing link, when necessary. This update is performed as follows: If the computed $A_{max}(t_1)$ is less than the request $p_j(t_1)$ that is the value in the ER field of the received RM cell, then the algorithm also modifies the ER field of the RM cell before transmitting it. In this case the ER field is updated as the computed value of $A_{Max}(t_1)$. When $A_{max}(t_1)$ is greater than or equal to $p_j(t_1)$, the ER field is not modified.

As previously noted, in the case of the CCR value in the RM cell received being less than $p_j(t_1)$ or $A_{max}(t_1)$, an aggressive allocation policy will allocate only the CCR value. However, a more conservative approach would record the allocation as the minimum of $A_{max}(t_1)$ or $p_j(t_1)$. This way, the amount of allocation recorded for connection j, i.e., $A_j$ is the same as $A_{max}(t_1)$, even though the source is not using that rate, and is actually using only a smaller amount, CCR.

The algorithm requires a third step. The need for this step occurs only in the special case when the requests of all the connections sharing the outgoing link have been satisfied completely. Since there are no bottlenecked connections in this case, this presents a difficulty. If, for example, one of the connections were to increase its bandwidth request in such a way that the new request exceeds the bandwidth that can be allocated, the connection must now be marked bottlenecked. However, it is possible that, at that time, there is another connection in the satisfied state receiving a larger allocation than that which has been assigned to the bottlenecked connection. This situation can be prevented by finding the connection receiving the largest allocation and marking its state as bottlenecked even if it is receiving all its requested bandwidth. This prevents a situation where a connection in the satisfied state is actually receiving more bandwidth than another in the bottlenecked state. Thus, the algorithm maintains the virtual circuit identifier of the connection receiving the largest allocation in a separate variable and updates it on the receipt of every RM cell.

It will now be apparent that updates to our rate allocations can be done in $\Theta(1)$ time by maintaining current values of the following parameters, in addition to the current state of each connection.

1. The parameter $B_f(t)$ representing the free bandwidth
2. The equal share parameter, $B_{eq}(t)$
3. The value $A_i(t)$ corresponding to the current allocation for each connection i
4. The number of bottlenecked and satisfied connections, $N_b(t)$ and $N_u(t)$, respectively.

Figure 5A:
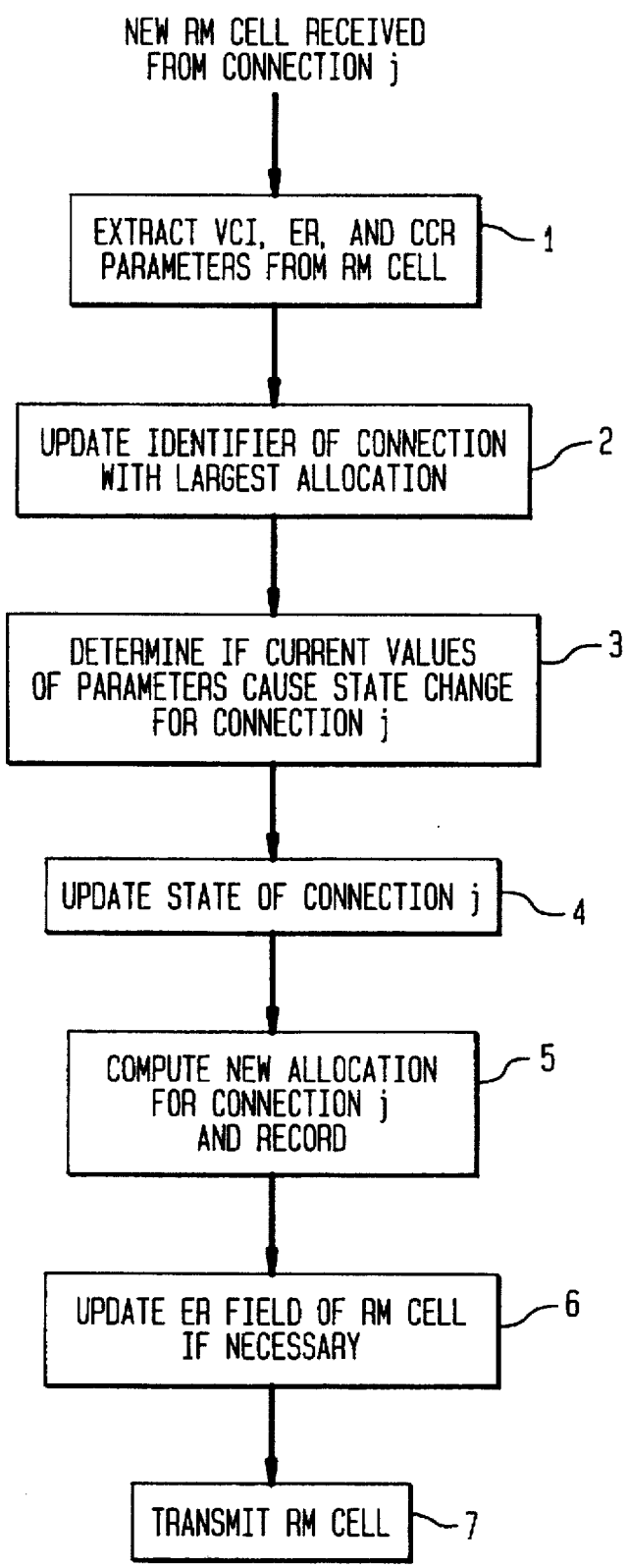
FIGS. 5A and 5B depicts the steps of the rate allocation method of the invention in flow chart form.
Figure 5B:
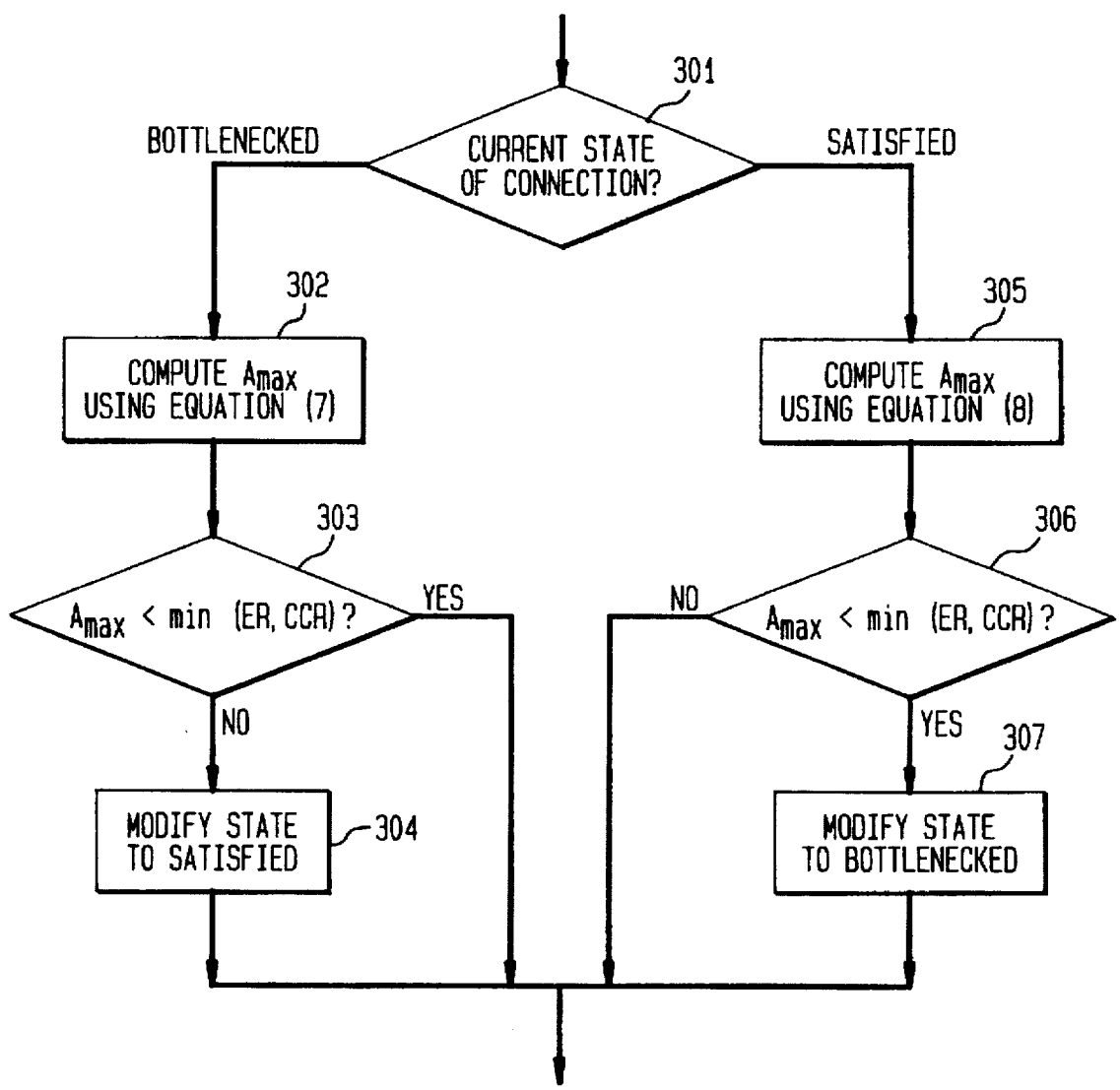

As we turn now to consideration of the actual steps of our algorithm, reference is made to FIGS. 5A and 5B which depict the operation of the invention in flow chart form. Additionally, the pseudo-code of our rate allocation algorithm is given in FIG. 6 and a set of notations used in the presentation of the algorithm is shown in FIG. 7.

As shown in step 1 of the flow chart of FIG. 5A (which represents the principal sequence of operations for our rate allocation algorithm) every time an RM cell is received by the switch, its VC identifier, ER, and CCR fields are read (lines 1–3 of the pseudo-code). Step 2 of FIG. 5A (and lines 4–15 of the pseudo code) carries out the function of maintaining the connection with the maximum request in the bottlenecked state, regardless of its allocation. This step, as previously discussed, is required to prevent oscillations in the allocation. More particularly, if the bandwidth that connection i requests is more than the currently registered maximum requested bandwidth (line 4 of pseudo-code) the algorithm sets the maximum requested bandwidth to the request posed by connection i (line 5 of pseudo-code) and also stores the VC number of this connection in the variable that holds the VC number of the connection with the largest request (line 6 of pseudo-code). Then the algorithm checks (at lines 7–10) if the connection with the maximum request is marked as satisfied; if this is true then it marks it as bottlenecked and the number of satisfied connections is decreased by one (along with increasing the number of bottlenecked connections by one). If connection i requests less bandwidth than the maximum registered request (line 11), and if i was the connection with the maximum request, then the algorithm updates the maximum requested bandwidth (lines 12–15).

Next, the algorithm computes the total bandwidth requested till the current time (lines 17–18 of pseudo-code) and thereby begins the process of determining if current values of parameters cause a state change for connection j, as shown in step 3 of the primary flow chart (FIG. 5A). If the total requested bandwidth, given by variable $R^a$ is more than the bandwidth available to the data traffic at output link a (lines 19–42) the algorithm tries to compute what is a max-min fair allocation for the connection. It first checks to find out if the connection is satisfied or bottlenecked (lines 20–24). Referring to the flow chart of FIG. 5B, which represents an expansion of the function of step 3 of FIG. 5A, it will be seen that our equations 7 or 8 are applied, depending on whether the current state of the connection is satisfied (Step 305) or bottlenecked (Step 302). Specifically, if the current state of the connection is satisfied, it is marked bottlenecked and the maximum bandwidth available to the connection is computed as if it were to become bottlenecked. Lines 25–26 of the pseudo-code make sure that the bandwidth allocated during transient periods is at least equal to the equal share $B_{eq}$. If the connection's request is less than what can be allocated and if the connection is not the connection with the maximum requested bandwidth, it is marked as satisfied. The bandwidth allocated to the connection is then set equal to its request. If the total requested bandwidth is less than what is available for the data traffic (lines 43–49), then all the connections are being satisfied and consequently marked as satisfied. In this case all the connections get the bandwidth that they requested. Upon completion of the steps of FIG. 5B, step 4 of FIG. 5A is implemented to update the state of the connection.

The remaining steps of the algorithm modifies the allocated bandwidth based on the CCR value obtained from the RM cell. If the allocation computed is more than the current rate, the connection is bottlenecked somewhere else in the network; in this case the connection is marked satisfied at the current switch. The parameter $B_f$ that keeps track of the bandwidth available for bottlenecked connections is updated (line 60). Finally, the explicit rate (ER) field which actually holds the amount of requested bandwidth is set to the maximum amount of bandwidth that can be allocated to the connection in the current switch (line 62 of pseudo-code and step 6 of FIG. 5A) and the resource management cell is forwarded to the output link $\alpha$ (line 63 of pseudo-code and step 7 of FIG. 5A).

The following initializations should be performed in order for the algorithm described above, and presented in FIG. 6, to operate properly:

$B_f^a \leftarrow B$
$N^a \leftarrow 0$
$N_b^a \leftarrow 0$
$M^a \leftarrow 0$

In addition, every time a new connection is opened or an existing connection closed, a number of parameters need to be updated. These updates are summarized in FIGS. 8 and 9, respectively.

Every time a request for closing a connection is received, the number of active connections for that output link should be decreased by one, the equal share should be re-evaluated, the total requested bandwidth should be decreased by the amount of bandwidth the closing connection requested and update the amount of bandwidth than can be shared by connections that remain marked as bottlenecked and therefore are not completely satisfied yet. Note that if the closing connection is the one that had the maximum request, then the variable that held the maximum request is reset to zero, thus, triggering a new cycle to find the next maximum request. The pseudo-code that performs these operations is given in FIG. 9.

Finally, the total bandwidth B must be updated with every change in the bandwidth available to best-effort traffic on the link, followed by recomputation of $B_{eq}$.

To summarize the inventive methodology here, the rate allocation algorithm of our invention has some important properties making it especially attractive for application to ATM or more generally to packet switching networks.

A particularly important characteristic of that algorithm is the implementation complexity. The complexity of $\Theta(1)$ makes it attractive for use in ATM switches carrying very large numbers of virtual channels. This presents a substantial improvement over the scheme of Charny94, which has an asymptotic complexity of $\Theta(n)$ where n is the number of active connections. The algorithm also provides flexibility not found in prior art methods inasmuch as the sources can request from the network any amount of bandwidth at any time. And, as already shown, our algorithm provides bandwidth allocation that meets the max-min fairness criterion.

Another very important characteristic of our invention is found in the fact of the allocation algorithm being performed on the reception of every RM cell, in contrast to other algorithms which may so only periodically. Those prior art allocation methods have to perform their algorithm sufficiently infrequently so that even the slowest source has an RM cell transmitted per allocation interval. This tends to make the allocation process very sluggish. The algorithm of our invention is responsive to the fast sources and the changes in their rate requests, while still retaining the allocation for the slow source over its round trip time. In other words, the reallocation of bandwidth for the fast sources is made at the fast time scale of the requests from those sources, notwithstanding the pace of the slow sources, which are serviced at that slower pace.

Since the main application of this algorithm will be to best-effort or other low-priority data traffic, it can operate stably while still providing fair bandwidth allocation, even when the bandwidth available to these traffic varies with time. As will be apparent, the algorithm can be applied to a network with heterogeneous link capacities. The algorithm is asynchronous and distributed, and is executed independently by the switches, which compute the fair bandwidth allocations based only on the bandwidth requests and the bandwidth available on the outbound links. Moreover, the algorithm does not require the cooperation of all the switches in a network. Switches that do not implement the algorithm can still co-exist with those that do. It is noted, however, that cooperation from all the switches will lead to more efficient congestion control.

The algorithm is robust in the sense that the loss of one or more resource management cells does not affect its correctness or stability. As will be apparent, however, such RM cell losses can cause a delay in the reaction of a switch to a bandwidth request from a source. As an alternative approach, such a potential loss of RM cells may be avoided by sending those cells out of band—i.e., every switch would treat the RM cells as high priority traffic and would serve them before servicing cells belonging to ABR traffic.

Figure 10:
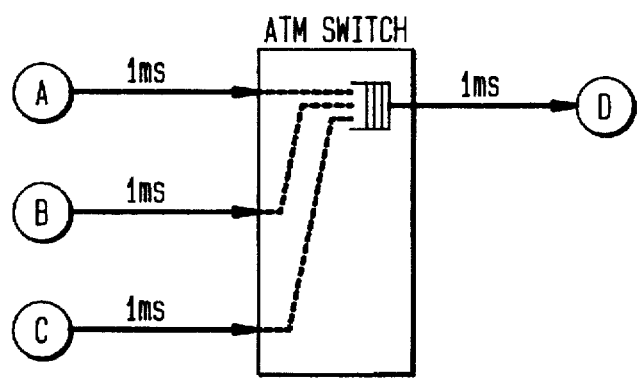
FIG. 10 depicts another exemplary network configuration for implementation of the congestion control method of the invention.

We have carried out extensive simulation tests with the congestion control method of our invention and a detailed discussion of the simulation methodology and the results will be found in Kalampoukas95. For purposes of illustrating the operation of the method of our invention, we will briefly describe here some results from simulation of the operation of our the rate allocation algorithm in a simple network. The illustrative network consists of a single switch and three connections, and is depicted in FIG. 10. All the three connections go through the same bottleneck link, have a capacity of 155 Mbits/sec each (equivalent to cell rate of 365,566 cells/sec.), and a propagation delay of 1 ms. The round-trip time was observed to be of the order of 5 ms taking into account propagation and queuing delays.

Figure 13:
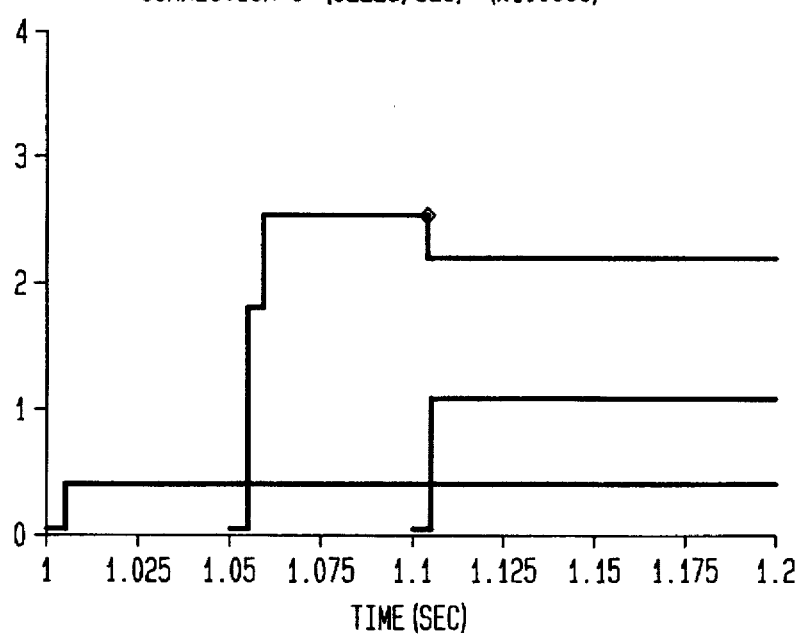
FIG. 13 provides a graphical presentation of a third set of simulation results.

This example network configuration contains three connections: A→D, B→D and C→D. Hereafter we will refer to these connection by the name of the source node—i.e. A, B, or C. The opening times of these connections as well as their bandwidth requests are based on the scenarios described in Table 1. The third line in this table shows the percentage of the bottleneck's link capacity requested by each of the connections.

for 109,670 cells/sec, 30% of the total link capacity. According to the max-rain fairness, C's request should be completely satisfied. This can be seen to occur in FIG. 13. The allocation to connection B is reduced accordingly, to about 60% of link capacity. Note that in this scenario the network converges in two round-trip delays which is within the maximum bound given earlier.

While we have shown a configuration with only one switch for application of these scenarios, it will be understood that the bandwidth requests at each of the connections could also reflect allocations at previous hops in a more complex network of switches, where there are multiple bottlenecks.

Although the present embodiment of the invention has been described in detail, it should be understood that various changes, alterations and substitutions can be made therein

TABLE 1

|  | SCENARIO 1 | | | SCENARIO 2 | | | SCENARIO 3 | | |
| --- | --- | --- | --- | --- | --- | --- | --- | --- | --- |
|  | A | B | C | A | B | C | A | B | C |
| Start Time (sec) | 1.0 | 1.06 | 1.1 | 1.05 | 1.0 | 1.0 | 1.0 | 1.05 | 1.1 |
| Requested Rate (cells/sec) | 365,566 | 365,566 | 365,566 | 36,556 | 219,340 | 219,340 | 36,556 | 255,896 | 109,670 |
| Relative Rate (% ink rate) | 100% | 100% | 100% | 10% | 60% | 60% | 10% | 70% | 30% |

A. Scenario 1

Figure 11:
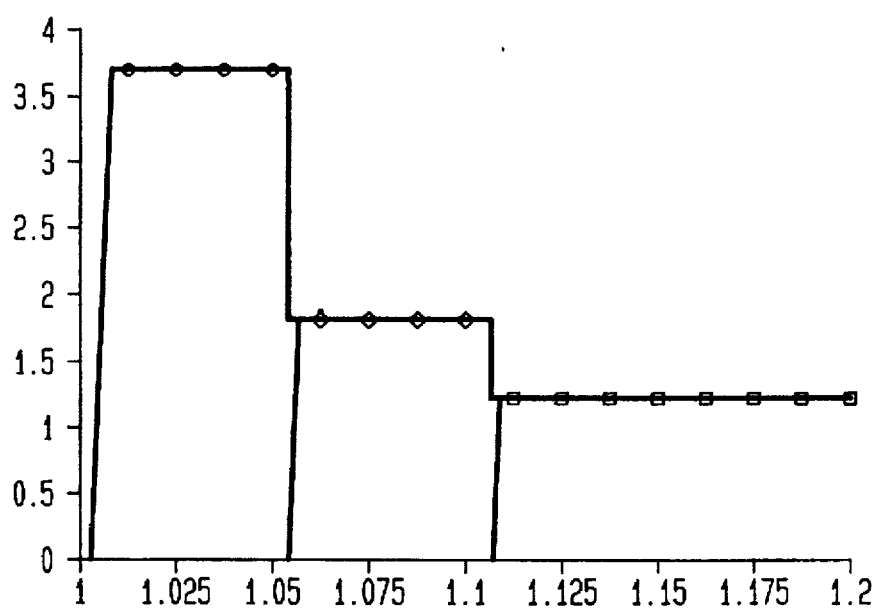
FIG. 11 provides a graphical presentation of a first set of simulation results.

In this scenario, all the connections request the maximum possible bandwidth. At time t=1 sec, connection A opens and requests a bandwidth of 365,566 cells/sec, which is 100% of the link capacity. As shown in FIG. 11 within approximately 5 ms, connection A gets the requested bandwidth since it is the only connection in the network. Note that in this case the network converged in 5 ms which is almost equal to one round-trip delay. Connection B comes up at time t=1.05 sec and requests 100% of link capacity. Since neither of the two requests can be satisfied, connection B will get its fair share which is 50% of the link capacity (that is, 365,566/2=182,783 cells/see); this again occurs within 5 ms. At the same time, the allocation of connection A is reduced by half. Finally at time t=1.1 ms, when the third connection opens, connections A and B both reduce their transmission rate to the new fair share which has been reduced now to about 33.3% or 365,566/3=121,855 cells/sec. Connection C converges to its new fair share within one round-trip delay.

B. Scenario 2

Figure 12:
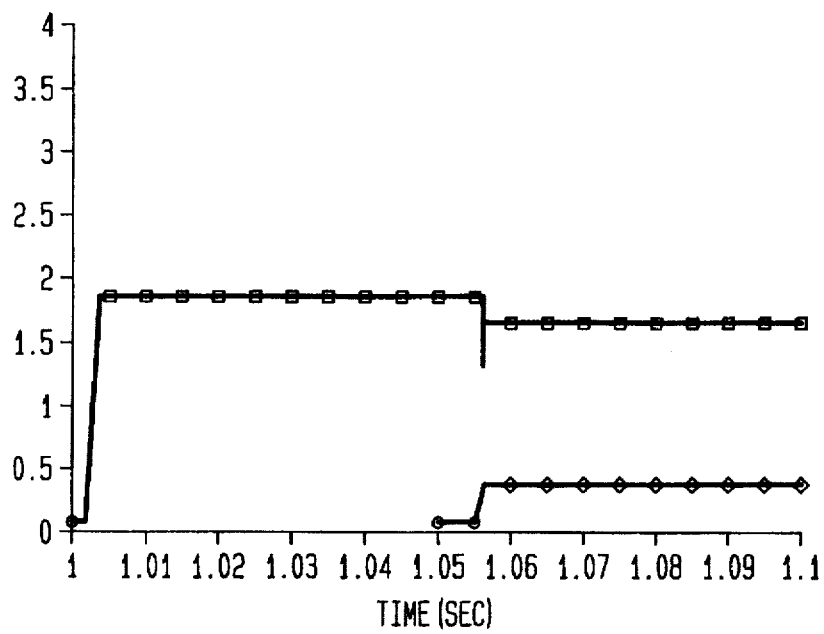
FIG. 12 provides a graphical presentation of a second set of simulation results.

In this case, connections B and C open at time t=1 sec and each requests 219,340 cells/see, more than the fair share. Therefore, both of them get equal share of the link bandwidth. When connection A opens and requests 36,556 cells/see, it is completely satisfied as the request is less than the equal share. Therefore, connection A gets 36,556 cells/see, while each one of connections B and C gets (365,566−36,556)/2=164,505 cells/sec. Thus, the allocation satisfies max-min fairness. FIG. 12 shows the behavior of this configuration. Note that the network converges again within one round-trip time delay.

C. Scenario 3

In this scenario, connection A starts first at time t=1 sec, requests 36,556 cells/see, which is only 10% of the total available bandwidth, and is therefore satisfied. At time t=1.05 sec, connection B comes up and requests 255,896 cells/see bandwidth which is 70% of the total available bandwidth. Therefore, connection B is also satisfied. At time t=1.1 sec, connection C starts transmission and its request is without departing from the spirit and scope of the invention as defined by the appended claims. In particular, it is noted that, while the invention has been primarily described in terms of a preferred embodiment based on ATM technology, the method and concept of the invention may be applied with respect to any packet oriented communications network.

We claim:

1. A congestion control method for communications networks comprising the steps of:

causing a data source to periodically inject into a data flow from said source first indicator representative of a rate at which said source is currently transmitting data to said network and a second indicator representative of a rate at which said source is desirous of transmitting data;

determining an allocation according to a predetermined criterion for bandwidth to be apportioned among competing data flows at switches within said network;

operating on said second indicator at successive switches in a transmission path in said network between said source and a destination to compare said rate represented by said second indicator with a maximum rate allocation determined by said switch;

changing said rate representation in said second indicator to said maximum rate allocation where said rate represented by said second indicator is greater than said maximum rate allocation;

returning said first and said second indicators to said source after said indicators have traversed all switches in said network transmission path between said source and said destination, whereby any modification of said rate represented by said second indicator by any of said traversed switches operates to establish a maximum data transmission rate for said source; and wherein said determining, said operating and said changing steps are applied for a data flow from a given source contemporaneous with a receipt of said indicators for each said data flow.

2. The congestion control method of claim 1 wherein a rate allocation made for a data flow under consideration at a given switch is independent of frequency of receipt at said switch of said first and second indicators for said competing data flows.

3. The congestion control method of claim 1 wherein said allocation criterion of said determining step is max-rain fairness.

4. The congestion control method of claim 1 wherein said data flow from said source is simultaneously transmitted to multiple destinations, said allocation is determined for each said data flow transmitted to each of said multiple destinations, and said maximum data transmission rate for said source is determined as a minimum of said maximum rate allocations among all of said data flows transmitted to said multiple destinations.

5. The congestion control method of claim 1 wherein said application of said determining, operating and changing steps is carried out for each said data flow from each said given source with an execution time that is independent of the number of said competing data flows.

6. A congestion control method for communications networks comprising the steps of:

causing a data source to periodically inject into a data flow from said source a first indicator representative of a rate at which said source is currently transmitting data to said network and a second indicator representative of a rate at which said source is desirous of transmitting data;

determining an allocation according to a predetermined criterion for bandwidth to be apportioned among competing data flows at switches within said network;

operating on said second indicator at successive switches in a transmission path in said network between said source and a destination to compare said rate represented by said second indicator with a maximum rate allocation determined by said switch;

changing said rate representation in said second indicator to said maximum rate allocation where said rate represented by said second indicator is greater than said maximum rate allocation;

returning said first and said second indicators to said source after said indicators have traversed all switches in said network transmission path between said source and said destination, whereby any modification of said rate represented by said second indicator by any of said traversed switches operates to establish a maximum data transmission rate for said source; and wherein said determining step, said operating step and said changing step are carried out by an algorithm characterized in that its execution is independent of a number of competing data flows at a transmission link within said network.

7. The congestion control method of claim 6 wherein said algorithm is further characterized as storing parameter values for said competing data flows.

8. The congestion control method of claim 6 wherein said algorithm is further characterized as being of algorithmic order $\Theta(1)$.

9. The congestion control method of claim 6 wherein execution of said algorithm carries out the following steps:

extracting a value of said first and said second indicators and an identification of said source for members of said competing data flows;

causing a state of a member of said competing data flows with a largest bandwidth request to be identified as bottlenecked;

determining if a current value of said second indicator causes a state change for said data flow from said source;

updating a state of said current data flow from said source;

computing a new bandwidth allocation for said current data flow from said source and recording said allocation in a storage means;

revising said value of said second indicator where a requested value exceeds said allocation; and causing said first and said second indicators to be transmitted to a successive switch in said transmission path.

10. The congestion control method of claim 6 wherein said algorithm is of the form

| | | |
|---|---|---|
| 1 | i ←cell (VC) | /* get the VC number */ |
| 2 | $r_i^a$ ←cell (CCR) | /* get the current cell rate */ |
| 3 | $\rho_i^a$ ←cell (ER) | /* get the amount of requested bandwidth */ |
| 4 | if ($M^a < r_i^a$) then | /* if the maximum registered requested bandwidth is less than connection i's allocation */ |
| 5 | $M^a ← r_i^a$ | /* set the maximum requested bandwidth to connection i's CCR */ |
| 6 | $m^a ← i$ | /* register connection i as the one with the maximum request */ |
| 7 | if $state_i^a$ =satisfied then | /* if connection i is marked as satisfied */ |
| 8 | $state_i^a$ ←bottlenecked | /* initially mark it as bottlenecked */ |
| 9 | $N_b^a ← N_b^a + 1$ | /* increase the number of bottlenecked connections by one */ |
| 10 | end if | |
| 11 | else if ($M^a > r_i^a$) then | /* if the registered maximum request is larger than i's CCR */ |
| 12 | if ($m^a = i$) | /* if it was i that had the maximum request */ |
| 13 | $M^a ← r_i^a$ | /* update the maximum request */ |
| 14 | end if | |
| 15 | end if | |
| 16 | $R^a ← R^a + \rho_i^a - l_i^a$ | /* Update the estimate of the total requested bandwidth */ |
| 17 | $l_i^a ← \rho_i^a$ | /* Update the recorded value for i's requests */ |
| 18 | if ($R^a > B^a$) then | /* if the total requested bandwidth is larger than the bandwidth available to data traffic */ |
| 19 | if $state_i^a$ = satisfied then | /* if connection i is marked as satisfied */ |
| 20 | temp ←$N_b^a + 1$ | /* increase the number of bottlenecked connections by one and treat i as bottlenecked*/ |

-continued

| | | |
|---|---|---|
| 21 | else | |
| 22 | temp ←$N_b^a$ | /* else the number of bottlenecked connections is not affected */ |
| 23 | end if | |
| 24 | $A_{max}^a \leftarrow B_{eq}^a + \dfrac{B_f^a + A_i^a - B_{eq}^a}{temp}$ | /* compute a new maximum fair allocation for connection i */ |
| 25 | if $A_{max}^a < B_{eq}^a$ then | /* if the newly computed allocation is less than the equal share */ |
| 26 | $A_{max}^a \leftarrow B_{eq}$ | /* set the allocation at least equal to the new fair share */ |
| 27 | end if | |
| 28 | if ($\rho_i^a \leq A_{max}^a$) then | /* if connection i requests less bandwidth than what is allocated above */ |
| 29 | $A_{max}^a \leftarrow \rho_i^a$ | /* connection i gets what it requested */ |
| 30 | if ($m^a \neq i$) then | /* if this is not the connection with the maximum request */ |
| 31 | if $state_i^a$ = bottlenecked then | |
| | | /* if connection i is not marked as satisfied */ |
| 32 | $state_i^a \leftarrow$ satisfied | /* mark connection i as satisfied */ |
| 33 | $N_b^a \leftarrow N_b^a - 1$ | /* decrease number of bottlenecked connections by one */ |
| 34 | end if | |
| 35 | end if | |
| 36 | else    /* else if connection i asks for more bandwidth than what can be allocated to it */ | |
| 37 | if $state_i^a$ =satisfied then | /* if connection i is marked as satisfied */ \\ |
| 38 | $state_i^a \leftarrow$ bottlenecked | /* unmark connection i */ |
| 39 | $N_b^a \leftarrow N_b^a + 1$ | /* increase number of bottlenecked connections by one */ |
| 40 | end if | |
| 41 | end if | |
| 42 | else    /* if the total requested bandwidth is less than the bandwidth available for data traffic */ | |
| 43. | if $state_i^a$=bottlenecked then | |
| | | /* if connection i is bottlenecked */ |
| 44 | $state_i^a \leftarrow$ satisfied | /* mark connection i as satisfied */ |
| 45 | $N_b^a \leftarrow N_b^a - 1$ | /* decrease the number of bottlenecked connection by one */ |
| 46 | $A_{max}^a \leftarrow \rho_i^a$ | /* allocate to connection i what it requests */ |
| 47 | end if | |
| 48 | end if | |
| 49 | if ($A_{max}^a >^r{_i^a}$)and($r_i^a$>0) then | |
| | | /* if the allocated bandwidth is larger than the current rate and the current rate is non-zero */ |
| 50 | if ($m^a \neq i$) then | /* if i is not the connection with the maximum request */ |
| 51 | if $state_i^a$=bottlenecked then | |
| | | /* if i is marked as bottlenecked */ |
| 52 | $state_i^a \leftarrow$ satisfied | /* mark connection i as satisfied since i is bottlenecked at another link */ |
| 53 | $N_b^a \leftarrow N_b^a - 1$ | /* decrease the number of bottlenecked connections by one */ |
| 54 | end if | |
| 55 | end if | |
| 56 | end if | |
| 57 | if $state_i^a$ =bottlenecked then | /* if connection i is marked as bottlenecked after all */ |
| 58 | $r_i^a \leftarrow B_{eq}^a$ | /* record connection i as getting only the equal share */ |
| 59 | end if | |
| 60 | $B_f^a \leftarrow B_f^a + A_i^a - r_i^a$ | /* update the estimate of the bandwidth that can be allocated to the bottlenecked connections */ |
| 61 | $A_i^a \leftarrow r_i^a$ | /* record the allocated bandwidth as the minimum from current rate and computed allocation */ |
| 62 | cell (ER) ←$A_{max}^a$ | /* set the explicit rate field of the current resource management cell */ |
| 63 | forward (cell) | /* forward this cell to the next switch */. |

11. A congestion control system for communications networks comprising:

means for causing a data source to periodically inject into a data flow from said source a first indicator representative of a rate at which said source is currently transmitting data to said network and a second indicator representative of a rate at which said source is desirous of transmitting data;

means for determining an allocation according to a predetermined criterion for bandwidth to be apportioned among competing data flows at switches within said network;

means for operating on said second indicator at successive switches in a transmission path in said network between said source and a destination to compare said rate represented by said second indicator with a maximum rate allocation determined by said switch;

means for changing said rate representation in said second indicator to said maximum rate allocation where said rate represented by said second indicator is greater than said maximum rate allocation;

means for returning said first and said second indicators to said source after said indicators have traversed all switches in said network transmission path between said source and said destination; and wherein said determining, said operating and said changing means are applied to a data flow from a given source contemporaneous with a receipt of said indicators for each said data flow.

12. The congestion control system of claim 11 wherein a rate allocation made for a data flow under consideration at a given switch is independent of frequency of receipt at said switch of said first and second indicators for said competing data flows.

13. The congestion control system of claim 11 wherein said allocation criterion of said determining means is max-min fairness.

14. The congestion control system of claim 11 wherein said data flow from said source is simultaneously transmitted to multiple destinations, said allocation is determined for each said data flow transmitted to each of said multiple destinations, and further including means for establishing a maximum data transmission rate for said source as a minimum of said maximum rate allocations among all of said data flows transmitted to said multiple destinations.

15. The congestion control system of claim 11 wherein said application of said determining, operating and changing means is carried out for each said data flow from each said given source with an execution time that is independent of the number of said competing data flows.

16. A congestion control system for communications networks comprising:

means for causing a data source to periodically inject into a data flow from said source a first indicator representative of a rate at which said source is currently transmitting data to said network and a second indicator representative of a rate at which said source is desirous of transmitting data;

means for determining an allocation according to a predetermined criterion for bandwidth to be apportioned among competing data flows at switches within said network;

means for operating on said second indicator at successive switches in a transmission path in said network between said source and a destination to compare said rate represented by said second indicator with a maximum rate allocation determined by said switch;

means for changing said rate representation in said second indicator to said maximum rate allocation where said rate represented by said second indicator is greater than said maximum rate allocation;

means for returning said first and said second indicators to said source after said indicators have traversed all switches in said network transmission path between said source and said destination; and wherein said determining means, said operating means and said changing means are implemented in a rate allocation algorithm processor carrying out an algorithm characterized in that its execution is independent of a number of competing data flows at a transmission link within said network.

17. The congestion control system of claim 16 wherein said algorithm carried out by said rate allocation algorithm processor is further characterized as storing parameter values for said competing data flows.

18. The congestion control system of claim 16 wherein said algorithm carried ont by said rate allocation algorithm processor is further characterized as being of algorithmic order $\Theta(1)$.

19. The congestion control system of claim 16 wherein execution of said algorithm carries out the following steps:

extracting a value of said first and said second indicators and an identification of said source for members of said competing data flows;

causing a state of a member of said competing data flows with a largest bandwidth request to be identified as bottlenecked;

determining if a current value of said second indicator causes a state change for said data flow from said source;

updating a state of said current data flow from said source;

computing a new bandwidth allocation for said current data flow from said source and recording said allocation in a storage means;

revising said value of said second indicator where a requested value exceeds said allocation; and causing said first and said second indicators to be transmitted to a successive switch in said transmission path.

20. The congestion control system of claim 16 wherein said algorithm is of the form

| | | |
|---|---|---|
| 1 | $i \leftarrow$ cell (VC) | /* get the VC number */ |
| 2 | $r_i^a \leftarrow$ cell (CCR) | /* get the current cell rate */ |
| 3 | $\rho_i^a \leftarrow$ cell (ER) | /* get the amount of requested bandwidth */ |
| 4 | if $(M^a < r_i^a)$ then | /* if the maximum registered requested bandwidth is less than connection i's allocation */ |
| 5 | $M^a \leftarrow r_i^a$ | /* set the maximum requested bandwidth to connection i's CCR */ |
| 6 | $m^a \leftarrow i$ | /* register connection i as the one with the maximum request */ |
| 7 | if $state_i^a =$ satisfied then | /* if connection i is marked as satisfied */ |
| 8 | $state_i^a \leftarrow$ bottlenecked | /* initially mark it as bottlenecked */ |
| 9 | $N_b^a \leftarrow N_b^a + 1$ | /* increase the number of bottlenecked connections by one */ |
| 10 | end if | |
| 11 | else if $(M^a > r_i^a)$ then | /* if the registered maximum request is larger than i's CCR */ |
| 12 | if $(m^a = i)$ | /* if it was i that had the maximum request */ |
| 13 | $M^a \leftarrow r_i^a$ | /* update the maximum request */ |
| 14 | end if | |
| 15 | end if | |
| 16 | $R^a \leftarrow R^a + \rho_i^a - l_i^a$ | /* Update the estimate of the total requested bandwidth */ |
| 17 | $l_i^a \leftarrow \rho_i^a$ | /* Update the recorded value for i's requests */ |
| 18 | if $(R^a > B^a)$ then | /* if the total requested bandwidth is larger than the bandwidth available to data traffic */ |
| 19 | if $state_i^a =$ satisfied then | /* if connection i is marked as satisfied */ |
| 20 | temp $\leftarrow N_b^a + 1$ | /* increase the number of bottlenecked connections by one and treat i as bottlenecked*/ |

-continued

```
21      else
22        temp ←N_b^a              /* else the number of bottlenecked connections is not
                                     affected */
23      end if
24                B_f^a + A_i^a − B_eq^a   /* compute a new maximum fair allocation for connection i */
        A_max^a ← B_eq^a + ─────────────
                              temp
25      if A_max^a < B_eq^a then   /* if the newly computed allocation is less than the equal
                                     share */
26        A_max^a ←B_eq            /* set the allocation at least equal to the new fair share */
27      end if
28      if (ρ_i^a ≦ A_max^a) then  /* if connection i requests less bandwidth than what is
                                     allocated above */
29        A_max^a ←ρ_i^a           /* connection i gets what it requested */
30        if (m^a ≠ i) then        /* if this is not the connection with the maximum request */
31          if state_i^a = bottlenecked then
                                   /* if connection i is not marked as satisfied */
32            state_i^a←satisfied  /* mark connection i as satisfied */
33            N_b^a ←N_b^a − 1     /* decrease number of bottlenecked connections by one */
34          end if
35        end if
36      else    /* else if connection i asks for more bandwidth than what can be allocated to
                it */
37        if state_i^a =satisfied then  /* if connection i is marked as satisfied */ \\
38          state_i^a ←bottlenecked /* unmark connection i */
39          N_b^a ←N_b^a + 1       /* increase number of bottlenecked connections by one */
40        end if
41      end if
42      else    /* if the total requested bandwidth is less than the bandwidth available for data
                traffic */
43.       ifstate_i^a=bottlenecked then
                                   /* if connection i is bottlenecked */
44          state_i^a←satisfied    /* mark connection i as satisfied */
45          N_b^a ←N_b^a − 1       /* decrease the number of bottlenecked connection by
                                     one */
46          A_max^a ←ρ_i^a         /* allocate to connection i what it requests */
47        end if
48      end if
49      if (A_max^a >r_i^a)and(r_i^a>0) then
                                   /* if the allocated bandwidth is larger than the current
                                     rate and the current rate is non-zero */
50        if (m^a ≠ i) then        /* if i is not the connection with the maximum request */
51          if state_i^a=bottlenecked then
                                   /* if i is marked as bottlenecked */
52            state_i^a←satisfied  /* mark connection i as satisfied since i is bottlenecked
                                     at another link */
53            N_b^a ←N_b^a − 1     /* decrease the number of bottlenecked connections by
                                     one */
54          end if
55        end if
56      end if
57      if state_i^a =bottlenecked then  /* if connection i is marked as bottlenecked after all */
58        r_i^a ←B_eq^a            /* record connection i as getting only the equal share */
59      end if
60      B_f^a ←B_f^a + A_i^a − r_i^a   /* update the estimate of the bandwidth that can be
                                     allocated to the bottlenecked connections */
61      A_i^a ←r_i^a               /* record the allocated bandwidth as the minimum from
                                     current rate and computed allocation */
62      cell (ER) ←A_max^a         /* set the explicit rate field of the current resource
                                     management cell */
63      forward (cell )            /* forward this cell to the next switch */.
```

21. In a method of congestion control in a communications network, said network including a first plurality of switches and a second plurality of transmission links interconnecting said switches, each said link being characterized by a maximum data transmission rate which can be handled by said link, and wherein a data source is caused to periodically inject into a data flow from said source a first indicator representative of a rate at which said source is currently transmitting data to said network and a second indicator representative of a rate at which said source is desirous of transmitting data, the improvement comprising: an algorithm operative to determine, at each switch in said network traversed by said data flow, an allocation of a data transmission rate for said data flow and to modify said second indicator when said rate represented thereby exceeds said allocated data transmission rate, wherein said algorithm operates on a state of said data flow, as being unconstrained or bottlenecked, and rate parameters for said data flow, said maximum data transmission rate for a link including said data flow and a numerical value of a number of competing data flows sharing said link including said data flow, said operation of said algorithm being thereby independent of any state or rate parameters for said competing data flows.

22. The congestion control algorithm of claim 21 wherein said algorithm is characterized as being of algorithmic order $\Theta(1)$.

23. The congestion control algorithm of claim 21 wherein said algorithm operates on each receipt of said first and second indicators for a given data flow.

24. The congestion control algorithm of claim 21 wherein said algorithm performs a constant number of computational steps on receipt of said first and second indicators for a given data flow, independent of the number of competing data flows sharing a transmission link with said given data flow.

25. The congestion control algorithm of claim 21 wherein said algorithm maintains a record of a rate allocation parameter for each competing data flow included in a transmission link, but operates only on a rate allocation parameter represented by said second indicator for a data flow under consideration.

26. The congestion control algorithm of claim 21 wherein a rate allocation made for a data flow under consideration is set at the lesser of said rate represented by said first indicator and a maximum rate allocation computed for said data flow under consideration according to a predetermined criterion.

27. The congestion control algorithm of claim 21 wherein a change in a rate allocation of a data flow under consideration at a given switch occurs only upon receipt at said given switch of a one of said first or said second indicators for said data flow under consideration.

28. The congestion control algorithm of claim 21 wherein a rate allocation made for a data flow under consideration at a given switch is independent of frequency of receipt at said switch of said first and second indicators for competing data flows sharing a link with said data flow under consideration.

29. The congestion control algorithm of claim 21 wherein said algorithm causes an initial rate allocation to be established in a switch for a given data flow at start-up of said given data flow.

30. The congestion control algorithm of claim 29 wherein said start-up of said given data flow occurs when a set up request for said given data flow arrives at said switch in a transmission path for said given data flow.

31. The congestion control algorithm of claim 21 wherein execution of said algorithm carries out the following steps at a switch where said algorithm is operating:

extracting a value of said first and said second indicators for, and an identification of a data flow under consideration;

causing a state of a member of said competing data flows with a largest bandwidth request to be identified as bottlenecked;

determining if a value of said second indicator causes a state change for said data flow under consideration at said switch;

updating a state of said data flow under consideration;

computing a new rate allocation for said data flow under consideration and recording said allocation in a storage means;

revising said value of said second indicator where a requested value exceeds said allocation; and causing said first and said second indicators to be transmitted to a successive switch in said transmission path.

32. The congestion control algorithm of claim 21 wherein said algorithm is of the form:

```
1    i ← cell (VC)                    /* get the VC number */
2    ERᵢ←cell(ER);CCRᵢ←cell(CCR)
                                      /* read ER and CCR fields of RM cell */
3    ρᵢ←min(ERᵢ,CCRᵢ)                 /* ρᵢ is the request of connection i */
             /* Compute maximum local allocation A_max. /*
4    B_eq←B/N                         /* compute equal share */
5    if stateᵢ = bottlenecked then
```

$$6 \quad A_{max} \leftarrow B_{eq} + \frac{B_f}{N_b}$$

```
7    else
```

$$8 \quad A_{max} \leftarrow B_{eq} + \frac{B_f + A_i' - B_{eq}}{N_b + 1}$$

```
             /* Determine new state of connection */
9    A_max← max(A_max,B_eq)
10   if (A_max < ρᵢ) and (stateᵢ = satisfied) then
11        stateᵢ ← bottlenecked; N_b ← N_b + 1
12   if (A_max > ρᵢ) and (stateᵢ = bottlenecked) then
13        stateᵢ ← satisfied; N_b ← N_b − 1
             /* Compute the local allocation Aᵢ */
14   if (stateᵢ = satisfied) then Aᵢ ← ρᵢ
15   else Aᵢ ← A_max
             /* Update ER field of RM cell */
16   cell(ER) ← min(A_max,ERᵢ)
     /* Maintain state of connection with the largest allocation as bottlenecked */
17   if (Aᵢ > MaxAllocation) then    /* mark this connection ("VC") as the one with
                                         the largest allocation */
18        MaxVC ← i; MaxAllocation ← Aᵢ
19        if (stateᵢ = satisfied) then  /* mark it as bottlenecked */
20             stateᵢ ← bottlenecked; N_b ← N_b + 1
21   if(MaxVC =i)and(Aᵢ<MaxAllocation)
22   /* This is the VC with the largest allocation and its allocation went down */
23        MaxAllocation ← Aᵢ          /* update the largest allocation */
             /* Update local allocation maintained in the switch */
24   A_old←Aᵢ'                        /* save old allocation */
25   if (stateᵢ = satisfied) then Aᵢ' ← Aᵢ
26   else Aᵢ' ← B_eq
```

-continued

```
27   /* Update free bandwidth B_f */
28   B_f←B_f+A_old−A_i'
29   forward(cell))         /* forward RM cell to the next switch */.
```

33. A congestion control method for communications networks comprising the steps of:
   causing a data source to periodically inject into a data flow from said source a first indicator representative of a rate at which said source is currently transmitting data to said network and a second indicator representative of a rate at which said source is desirous of transmitting data;
   determining an allocation according to a predetermined criterion for bandwidth to be apportioned among competing data flows at switches within said network;
   operating on said second indicator at successive switches in a transmission path in said network between said source and a destination to compare said rate represented by said second indicator with a maximum rate allocation determined by said switch;
   changing said rate representation in said second indicator to said maximum rate allocation where said rate represented by said second indicator is greater than said maximum rate allocation;
   returning said first and said second indicators to said source after said indicators have traversed all switches in said network transmission path between said source and said destination, whereby any modification of said rate represented by said second indicator by any of said traversed switches operates to establish a maximum data transmission rate for said source; and
   wherein said data flow from said source is simultaneously transmitted to multiple destinations, said allocation is determined for each said data flow transmitted to each of said multiple destinations, and said maximum data transmission rate for said source is determined as a minimum of said maximum rate allocations among all of said data flows transmitted to said multiple destinations.

34. A congestion control method for communications networks comprising the steps of:
   causing a data source to periodically inject into a data flow from said source a first indicator representative of a rate at which said source is currently transmitting data to said network and a second indicator representative of a rate at which said source is desirous of transmitting data;
   determining an allocation according to a predetermined criterion for bandwidth to be apportioned among competing data flows at switches within said network;
   operating on said second indicator at successive switches in a transmission path in said network between said source and a destination to compare said rate represented by said second indicator with a maximum rate allocation determined by said switch;
   changing said rate representation in said second indicator to said maximum rate allocation where said rate represented by said second indicator is greater than said maximum rate allocation;
   returning said first and said second indicators to said source after said indicators have traversed all switches in said network transmission path between said source and said destination, whereby any modification of said rate represented by said second indicator by any of said traversed switches operates to establish a maximum data transmission rate for said source; and
   wherein a rate allocation made for a data flow under consideration at a given switch is independent of frequency of receipt at said switch of said first and second indicators for said competing data flows.

35. A congestion control system for communications networks comprising:
   means for causing a data source to periodically inject into a data flow from said source a first indicator representative of a rate at which said source is currently transmitting data to said network and a second indicator representative of a rate at which said source is desirous of transmitting data;
   means for determining an allocation according to a predetermined criterion for bandwidth to be apportioned among competing data flows at switches within said network;
   means for operating on said second indicator at successive switches in a transmission path in said network between said source and a destination to compare said rate represented by said second indicator with a maximum rate allocation determined by said switch;
   means for changing said rate representation in said second indicator to said maximum rate allocation where said rate represented by said second indicator is greater than said maximum rate allocation;
   means for returning said first and said second indicators to said source after said indicators have traversed all switches in said network transmission path between said source and said destination; and
   wherein said data flow from said source is simultaneously transmitted to multiple destinations, said allocation is determined for each said data flow transmitted to each of said multiple destinations, and further including means for establishing a maximum data transmission rate for said source as a minimum of said maximum rate allocations among all of said data flows transmitted to said multiple destinations.

36. A congestion control system for communications networks comprising:
   means for causing a data source to periodically inject into a data flow from said source a first indicator representative of a rate at which said source is currently transmitting data to said network and a second indicator representative of a rate at which said source is desirous of transmitting data;
   means for determining an allocation according to a predetermined criterion for bandwidth to be apportioned among competing data flows at switches within said network;
   means for operating on said second indicator at successive switches in a transmission path in said network between said source and a destination to compare said rate represented by said second indicator with a maximum rate allocation determined by said switch;
   means for changing said rate representation in said second indicator to said maximum rate allocation where said rate represented by said second indicator is greater than said maximum rate allocation;

means for remaining said first and said second indicators to said source after said indicators have traversed all switches in said network transmission path between said source and said destination; and wherein a rate allocation made for a data flow under consideration at a given switch is independent of frequency of receipt at said switch of said first and second indicators for said competing data flows.

37. In a method of congestion control in a communications switch, said switch including at least one port having connected there at a plurality of communications paths carrying signals having non-zero bandwidth requirements, wherein said plurality of said signals compete for a total bandwidth available at said at least one port, and whereby a source for a given signal carried by a one of said plurality of communications paths is caused to periodically inject into said given signal a first indicator representative of a rate at which said source is currently transmitting information to said communications path and a second indicator representative of a rate at which said source is desirous of transmitting information, the improvement therein comprising a step of:

determining an allocation of a transmission rate for said given signal and modifying said second indicator when said rate represented thereby exceeds said allocated transmission rate, wherein said determining step operates on a state of said given signal, as being unconstrained or bottlenecked, rate parameters for said given signal, said total bandwidth available at said at least one port, and a stored value of a transmission rate for each of said competing communications paths sharing said port, said operation of said determining step being thereby independent of any current state or rate parameters for said competing communications paths.

38. The congestion control method of claim 37 wherein said determining step performs a constant number of computational steps on receipt of said first and second indicators for said given signal, independent of the number of competing communications paths sharing said port.

39. The congestion control method of claim 37 wherein said determining step maintains a record of a rate allocation parameter for each competing communications paths sharing said port, but operates only on a rate allocation parameter represented by said second indicator for said given signal.

40. The congestion control method of claim 37 wherein a rate allocation made for said given signal is set at the lesser of said rate represented by said first indicator and a maximum rate allocation computed for said given signal according to a predetermined criterion.

41. The congestion control method of claim 37 wherein a rate allocation made for said given signal is independent of frequency of receipt at said port of said first and second indicators for competing communications paths sharing said port.

42. The congestion control method of claim 37 wherein execution of said determining step carries out the following steps:

extracting a value of said first and said second indicators for, and an identification of said given signal;

causing a state of a member of said competing communications paths sharing said port with a largest bandwidth request to be identified as bottlenecked;

determining if a value of said second indicator causes a state change for said given signal at said switch;

updating a state of said given signal;

computing a new rate allocation for said given signal and recording said allocation in a storage means; and revising said value of said second indicator where a requested value exceeds said allocation.

43. A congestion control method for controlling bandwidth allocations among a plurality of competing communications paths connected at a port of a communications switch, said paths carrying signals having non-zero bandwidth requirements, wherein at least one source for a signal carried by a one of said plurality of communications paths is caused to periodically inject into said signal a first indicator representative of a rate at which said source is currently transmitting information to said communications path and a second indicator representative of a rate at which said source is desirous of transmitting information, said congestion control method carrying out the steps of:

extracting a value of said first and said second indicators for, and an identification of a given signal;

causing a state of a member of said competing communications paths sharing said port with a largest bandwidth request to be identified as bottlenecked;

determining if a value of said second indicator causes a state change for said given signal at said switch;

updating a state of said given signal;

computing a new rate allocation for said given signal and recording said allocation in a storage means; and revising said value of said second indicator where a requested value exceeds said allocation.

* * * * *

UNITED STATES PATENT AND TRADEMARK OFFICE
CERTIFICATE OF CORRECTION

PATENT NO. : 5,675,576
DATED : October 7, 1997
INVENTOR(S) : Kalampoukas et al.

It is certified that error appears in the above-identified patent and that said Letters Patent is hereby corrected as shown below:

On the title page item [54], change "CONCESTION CONTROL SYSTEM AND METHOD FOR PACKET SWITCHED NETWORKS PROVIDING MAX-MIN FAIRNESS" to --CONGESTION CONTROL SYSTEM AND METHOD FOR PACKET SWITCHED NETWORKS PROVIDING MAX-MIN FAIRNESS--.

Signed and Sealed this

Third Day of March, 1998

Attest:

BRUCE LEHMAN

Attesting Officer

Commissioner of Patents and Trademarks